United States Patent
Ota et al.

(10) Patent No.: US 11,898,661 B2
(45) Date of Patent: Feb. 13, 2024

(54) FLUORORUBBER COMPOSITION

(71) Applicant: DAIKIN INDUSTRIES, LTD., Osaka (JP)

(72) Inventors: Daisuke Ota, Settsu (JP); Akinori Ueda, Settsu (JP); Yuu Kadowaki, Settsu (JP); Mayuko Taeda, Settsu (JP); Masanori Kitaichi, Settsu (JP); Kazuhiro Yamamura, Settsu (JP); Michiko Doi, Settsu (JP); Shoji Fukuoka, Settsu (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 1258 days.

(21) Appl. No.: 14/380,133

(22) PCT Filed: Feb. 22, 2013

(86) PCT No.: PCT/JP2013/055603
§ 371 (c)(1),
(2) Date: Aug. 21, 2014

(87) PCT Pub. No.: WO2013/125731
PCT Pub. Date: Aug. 29, 2013

(65) Prior Publication Data
US 2015/0330537 A1    Nov. 19, 2015

Related U.S. Application Data

(60) Provisional application No. 61/602,818, filed on Feb. 24, 2012.

(51) Int. Cl.
*F16L 11/04* (2006.01)
*C08L 27/16* (2006.01)
(Continued)

(52) U.S. Cl.
CPC ............... *F16L 11/04* (2013.01); *C08K 3/04* (2013.01); *C08L 27/12* (2013.01); *C08L 27/16* (2013.01);
(Continued)

(58) Field of Classification Search
CPC .... Y10T 428/1386; F16L 11/04; C08L 27/16; C08L 45/02; C08L 27/12; C08L 27/20;
(Continued)

(56) References Cited

U.S. PATENT DOCUMENTS 4,158,678 A    6/1979   Tatemoto et al.
4,243,770 A    1/1981   Tatemoto et al.
(Continued)

FOREIGN PATENT DOCUMENTS

CN    1989202 A    6/2007
DE    19812755 A1  9/1999
(Continued)

OTHER PUBLICATIONS

Carbon Black, Titanium Dioxide, and Talc. Lyon, France: International Agency for Research on Cancer, 2010. Print. ISBN 978-2-832-1293-5Ti.*

(Continued)

*Primary Examiner* — Lee E Sanderson
(74) *Attorney, Agent, or Firm* — Sughrue Mion, PLLC

(57) ABSTRACT

Provided is a fluororubber composition capable of providing a crosslinked fluororubber article that exhibits not only heat resistance, but also excellent mechanical properties at high temperatures. The fluororubber composition includes a fluororubber (A), a carbon black (B), and an aromatic petroleum resin (E), and the fluororubber composition has a difference δG' (G' (1%)–G' (100%)) of not lower than 120 kPa and not higher than 3,000 kPa, where G' (1%) denotes a shear modulus at a dynamic strain of 1%, G' (100%) denotes a (Continued)

shear modulus at a dynamic strain of 100%, and G' (1%) and G' (100%) are determined by a dynamic viscoelasticity test carried out on an unvulcanised rubber with a rubber process analyzer (RPA) in a condition that the measurement frequency is 1 Hz and the measurement temperature is 100° C.

3 Claims, 2 Drawing Sheets

(51) Int. Cl.
*C08L 27/12* (2006.01)
*C08K 3/04* (2006.01)
*C08L 45/02* (2006.01)
*F02M 37/16* (2006.01)
*F02M 37/00* (2006.01)

(52) U.S. Cl.
CPC ............ *C08L 45/02* (2013.01); *C08L 2312/00* (2013.01); *F02M 37/0017* (2013.01); *F02M 37/16* (2013.01); *Y10T 428/1386* (2015.01)

(58) Field of Classification Search
CPC ..... C08L 2312/00; B32B 25/14; B32B 25/18; B32B 25/20; C08K 3/04; F02M 37/0017
USPC .......... 428/36.8, 35.7; 525/326.3, 326.2, 88; 524/495, 520; 138/118–153
See application file for complete search history.

(56) References Cited

U.S. PATENT DOCUMENTS

| | | | |
|---|---|---|---|
| 4,543,394 A | 9/1985 | Finlay et al. | |
| 4,861,836 A | 8/1989 | Tatemoto et al. | |
| 4,962,236 A | 10/1990 | Tatemoto et al. | |
| 4,988,562 A | 1/1991 | Ryoke et al. | |
| 5,198,136 A | 3/1993 | Tatemoto et al. | |
| 5,508,355 A | 4/1996 | Toda et al. | |
| 5,700,861 A * | 12/1997 | Tomihashi ........... | C09D 127/12 524/344 |
| 6,232,390 B1 | 5/2001 | Ono et al. | |
| 6,252,006 B1 | 6/2001 | Tomihashi et al. | |
| 6,346,587 B1 | 2/2002 | Kruger et al. | |
| 9,006,328 B2 | 4/2015 | Ota et al. | |
| 9,045,614 B2 | 6/2015 | Ota et al. | |
| 9,068,053 B2 | 6/2015 | Yano et al. | |
| 2001/0031815 A1 | 10/2001 | Nakano et al. | |
| 2005/0085576 A1 | 4/2005 | Kinoshita et al. | |
| 2005/0159557 A1 | 7/2005 | Fukushi et al. | |
| 2008/0248225 A1 | 10/2008 | Bandyopadhyay | |
| 2008/0306196 A1 | 12/2008 | Irie et al. | |
| 2009/0263603 A1 | 10/2009 | Maeda et al. | |
| 2010/0004415 A1 | 1/2010 | Maeda et al. | |
| 2010/0051259 A1 | 3/2010 | Pessin et al. | |
| 2010/0069558 A1 * | 3/2010 | Stanga ................. | C08G 65/007 524/495 |
| 2010/0216933 A1 | 8/2010 | Wang | |
| 2011/0200777 A1 | 8/2011 | Doi et al. | |
| 2011/0269911 A1 | 11/2011 | Morita et al. | |
| 2011/0277918 A1 | 11/2011 | Lee et al. | |
| 2012/0067706 A1 | 3/2012 | Terada et al. | |
| 2012/0077924 A1 | 3/2012 | Ota et al. | |
| 2012/0077926 A1 | 3/2012 | Ota et al. | |
| 2012/0077927 A1 | 3/2012 | Ota et al. | |
| 2012/0077938 A1 | 3/2012 | Terada et al. | |
| 2012/0077939 A1 | 3/2012 | Ota et al. | |
| 2012/0095150 A1 | 4/2012 | Ota et al. | |
| 2012/0095151 A1 | 4/2012 | Terada et al. | |
| 2012/0259054 A1 | 10/2012 | Okutsu | |
| 2014/0228482 A1 | 8/2014 | Ota et al. | |
| 2014/0288226 A1 | 9/2014 | Ota et al. | |
| 2015/0017364 A1 | 1/2015 | Ota et al. | |
| 2015/0031822 A1 | 1/2015 | Ota et al. | |
| 2015/0133592 A1 | 5/2015 | Miyasaka et al. | |

FOREIGN PATENT DOCUMENTS

| | | | | |
|---|---|---|---|---|
| EP | 0683149 A2 | 11/1995 | | |
| EP | 2258767 A1 | 12/2010 | | |
| JP | 53-3495 | 1/1978 | | |
| JP | 53-125491 | 11/1978 | | |
| JP | 60-55050 A | 3/1985 | | |
| JP | 63-159336 A | 7/1988 | | |
| JP | 1-106330 A | 4/1989 | | |
| JP | 1-153745 A | 6/1989 | | |
| JP | 2-124913 A | 5/1990 | | |
| JP | 2-308841 A | 12/1990 | | |
| JP | 3-122153 A | 5/1991 | | |
| JP | 03122153 A * | 5/1991 | ............. | C08L 27/16 |
| JP | 4-359946 A | 12/1992 | | |
| JP | 6-25500 A | 2/1994 | | |
| JP | 7-11087 A | 1/1995 | | |
| JP | 7-134469 A | 5/1995 | | |
| JP | 7-196881 A | 8/1995 | | |
| JP | 8-3017 B2 | 1/1996 | | |
| JP | 10-219062 A | 8/1998 | | |
| JP | 11-193332 A | 7/1999 | | |
| JP | 11-344165 A | 12/1999 | | |
| JP | 2001-114964 A | 4/2001 | | |
| JP | 2001-261846 A | 9/2001 | | |
| JP | 2002-192528 A | 7/2002 | | |
| JP | 2003-13041 A | 1/2003 | | |
| JP | 2004-26897 A | 1/2004 | | |
| JP | 2004-123878 A | 4/2004 | | |
| JP | 2005-113017 A | 4/2005 | | |
| JP | 2005113017 A * | 4/2005 | ............. | C08L 27/12 |
| JP | 2006-70132 A | 3/2006 | | |
| JP | 2006-513304 A | 4/2006 | | |
| JP | 2007-137941 A | 6/2007 | | |
| WO | 2007148759 A1 * | 12/2007 | ............. | B32B 25/14 |
| JP | 2008-184496 A | 8/2008 | | |
| JP | 2009-224048 A | 10/2009 | | |
| JP | 2009-227780 A | 10/2009 | | |
| JP | 2009-256455 A | 11/2009 | | |
| JP | 2010-24339 A | 2/2010 | | |
| JP | 2010-285526 A | 12/2010 | | |
| JP | 2011-148902 A | 8/2011 | | |
| JP | 2011-522921 A | 8/2011 | | |
| JP | 2012-519221 A | 8/2012 | | |
| JP | 2013-14640 A | 1/2013 | | |
| JP | 2013-173929 A | 9/2013 | | |
| JP | 2013-173930 A | 9/2013 | | |
| JP | 2013-175462 A | 9/2013 | | |
| WO | 95/15359 A1 | 6/1995 | | |
| WO | 98/07784 A1 | 2/1998 | | |
| WO | 03/076535 A1 | 9/2003 | | |
| WO | 2004/067618 A1 | 8/2004 | | |
| WO | 2007/135937 A1 | 11/2007 | | |
| WO | 2007/148759 A1 | 12/2007 | | |
| WO | WO-2007148759 A1 * | 12/2007 | ............. | B32B 25/14 |
| WO | 2010007699 A1 | 1/2010 | | |
| WO | 2010/101304 A1 | 9/2010 | | |
| WO | 2012/026006 A1 | 3/2012 | | |
| WO | 2012/026007 A1 | 3/2012 | | |
| WO | 2012/026534 A1 | 3/2012 | | |
| WO | 2012/026552 A1 | 3/2012 | | |
| WO | 2012/026553 A1 | 3/2012 | | |
| WO | 2012/026554 A1 | 3/2012 | | |
| WO | 2012/026555 A1 | 3/2012 | | |
| WO | 2012/026556 A1 | 3/2012 | | |
| WO | 2012/026558 A1 | 3/2012 | | |
| WO | 2012/026559 A1 | 3/2012 | | |
| WO | 2013/108935 A1 | 7/2013 | | |
| WO | 2013/108936 A1 | 7/2013 | | |
| WO | 2013/125731 A1 | 8/2013 | | |

(56) References Cited

FOREIGN PATENT DOCUMENTS

WO    2013/125735 A1    8/2013
WO    2013/125736 A1    8/2013

OTHER PUBLICATIONS

NPL_SEAST-116-MAF_TOKAI Carbon (https://coatings.specialchem.com/product/p-tokai-carbon-seast-116-maf) (Year: 2020).*
Communication dated Mar. 6, 2015 from the European Patent Office in application No. 13739075.3.
Communication dated Mar. 3, 2015 from the European Patent Office in application No. 13738608.2.
Communication dated Dec. 8, 2014, issued by the Japanese Patent Office in related Japanese application No. 2014-506387.
Communication dated Jul. 21, 2015 from the European Patent Office in counterpart application No. 13752402.1.
Communication dated Jul. 21, 2015 from the European Patent Office in counterpart application No. 13751700.9.
Communication dated Oct. 7, 2015 from the United States Patent and Trademark Office in counterpart U.S. Appl. No. 14/380,197.
"Physical & Chemical Properties", Anonymous, Jan. 20, 2006 (Jan. 20, 2006), XP55248779, 7 pages total.
International Search Report and Written Opinion of the International Searching Authority dated Mar. 19, 2013 for PCT/JP2013/051512.
International Search Report and Written Opinion of the International Searching Authority dated Mar. 19, 2013 for PCT/JP2013/051513.
International Search Report and Written Opinion of the International Searching Authority dated Jun. 4, 2013 for PCT/JP2013/055603.
International Search Report and Written Opinion of the International Searching Authority dated Jun. 4, 2013 for PCT/JP2013/055611.
International Search Report and Written Opinion of the International Searching Authority dated May 14, 2013 for PCT/JP2013/055612.
Communication dated Jul. 3, 2017 from U.S. Patent & Trademark Office in U.S. Appl. No. 14/380,101.
Communication dated Jul. 14, 2017 from the European Patent Office in related European Application No. 17167250.4.

* cited by examiner (a)

(b)

(c)

FLUORORUBBER COMPOSITION

CROSS-REFERENCE TO RELATED APPLICATION

This application is a National Stage of International Application No. PCT/JP2013/055603 filed Feb. 22, 2013, which claims benefit under 35 U.S.C. § 119(e) of U.S. Provisional Application No. 61/602,818 filed on Feb. 24, 2012, incorporated herein by reference in its entirety.

TECHNICAL FIELD

The present invention relates to a fluororubber composition which can give a crosslinked fluororubber article.

BACKGROUND ART

Fluororubbers are known to exhibit excellent chemical resistance, oil resistance, heat resistance, cold resistance and the like.

Patent Literature 1 proposes a bromine-containing fluororubber composition having improved compression set resistance even after being heated to a high temperature.

Patent Literature 2 proposes a vulcanized fluororubber composition which achieves an extremely high tensile strength and which gives a crosslinked article having similarly excellent compression set resistance, heat resistance, oil resistance and chemical resistance to a conventional vulcanized fluororubber.

Patent Literature 3 proposes a fluorine-containing elastomer which can give a vulcanized product having excellent elongation at break at a high temperature such as 100° C. and excellent compression set characteristics at a low temperature such as 0° C.

As a composition having excellent high-temperature strength, Patent Literature 4 proposes a fluororubber composition obtained by incorporating 5 to 100 parts by weight of a fluorine-containing thermoplastic elastomer in 100 parts by weight of a fluororesin (b).

As a rubber compounding agent such as a tackifier for a synthetic rubber, a cumarone resin is known. Patent Literature 5 discloses a rubber composition for an inner liner including a cumarone resin and a rubber composition for an inner liner composed of a natural rubber, a synthetic rubber, a mixture of a natural rubber and a synthetic rubber, or a mixture of synthetic rubbers.

Patent Literature 6 discloses a production method of a cumarone resin including: base removal treatment by acid cleaning of crude solvent naphtha containing an unsaturated compound such as cumarone, indene, and styrene; mixing a phenol (1 to 15 parts by weight) with distillate oil (100 parts by weight) prepared by excluding a heavy component by distillation treatment; and allowing the contents to polymerize in the presence of a Friedel-Crafts catalyst at a reaction temperature of 40 to 120° C. Patent Literature 6 discloses that the cumarone resin is used in a rubber compounding agent and the like such as a tackifier for synthetic rubber.

Patent Literature 7 discloses a rubber composition that includes (A) a rubber component (100 parts by weight) containing styrene-butadiene rubber, (B) liquid styrene-butadiene rubber (10 parts by weight or more) with a weight average molecular weight of 1000 to 5000, and (C) an aromatic petroleum resin (5 parts by weight or more). Examples of the aromatic petroleum resin (C) include a phenol resin, a cumarone indene resin, a styrene resin, a rosin resin, and a DCPD resin.

CITATION LIST

Patent Literature

[Patent Literature 1] Japanese Patent Application Publication No. S60-55050
[Patent Literature 2] Japanese Patent Application Publication No. H3-122153
[Patent Literature 3] Japanese Patent Application Publication No. 2008-184496
[Patent Literature 4] Japanese Patent Application Publication No. H06-25500
[Patent Literature 5] Japanese Patent Application Publication No. H4-359946
[Patent Literature 6] Japanese Patent Application Publication No. H2-124913
[Patent Literature 7] Japanese Patent Application Publication No. 2007-137941

SUMMARY OF INVENTION

Technical Problem

An objective of the present invention is to provide a fluororubber composition which can provide a crosslinked fluororubber article that exhibits not only heat resistance, but also excellent mechanical properties at high temperatures.

Solution to Problem

The present invention relates to a fluororubber composition comprising: a fluororubber (A), a carbon black (B), and an aromatic petroleum resin (E), the fluororubber composition having a difference $\delta G'$ ($G'$ (1%)–$G'$ (100%)) of not lower than 120 kPa and not higher than 3,000 kPa, where $G'$ (1%) denotes a shear modulus at a dynamic strain of 1%, $G'$ (100%) denotes a shear modulus at a dynamic strain of 100%, and $G'$ (1%) and $G'$ (100%) are determined by a dynamic viscoelasticity test carried out on an unvulcanised rubber with a rubber process analyzer (RPA) in a condition that the measurement frequency is 1 Hz and the measurement temperature is 100° C.

The present invention also relates to a crosslinked fluororubber article obtainable by crosslinking of the fluororubber composition. The present invention further relates to a hose including a crosslinked fluororubber layer obtainable by crosslinking of the fluororubber composition.

Advantageous Effects of Invention

According to the fluororubber composition of the present invention, it is possible to provide a crosslinked article that exhibits not only heat resistance, but also excellent mechanical properties at high temperatures.

DESCRIPTION OF EMBODIMENTS (A) Fluororubber

Figure 1:
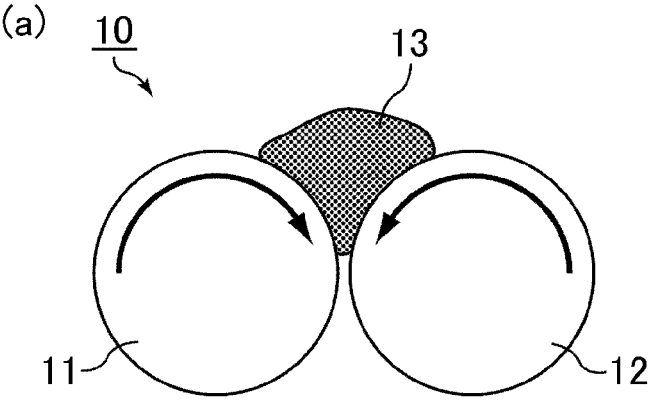
FIG. 1 is a diagram showing a schematic view of the mixing method used in step (2-1) and step (2-2).
Figure 1:
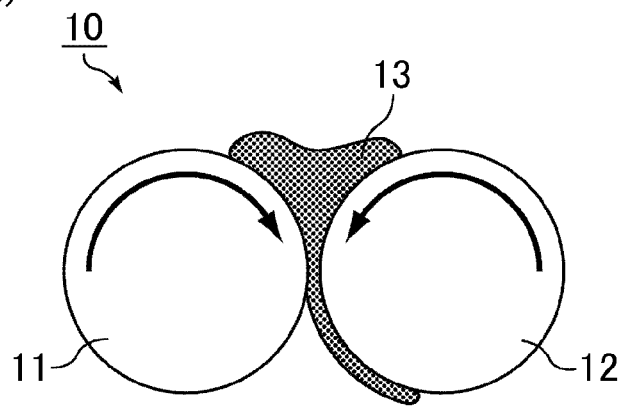
Figure 1:
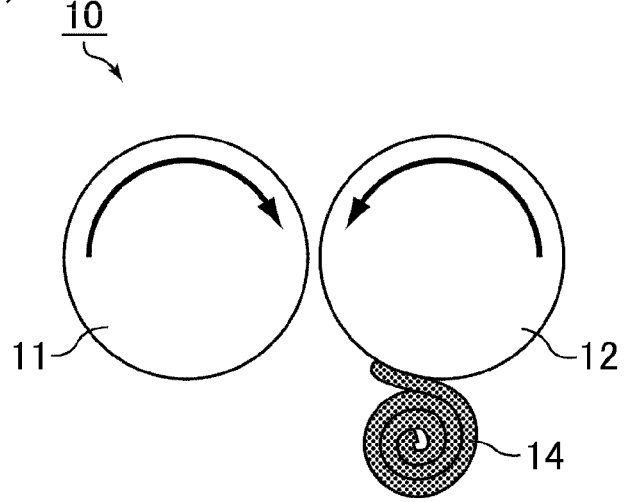

The fluororubber composition of the present invention includes a fluororubber (A). Therefore, the obtained cross-linked article is excellent in heat resistance.

The fluororubber (A) used in the present invention preferably contains a structural unit derived from at least one type of monomer selected from among the group comprising, for example, tetrafluoroethylene (TFE), vinylidene fluoride (VdF) and a perfluoro ethylenically unsaturated compound represented by formula (1):

$$CF_2=CF-R_f^a \quad (1)$$

(where, $R_f^a$ is —$CF_3$ or —$OR_f^b$ ($R_f^b$ is a perfluoroalkyl group having 1 to 5 carbon atoms) (for example, hexafluoropropylene (HFP), a perfluoro(alkyl vinyl ether) (PAVE) and the like).

From a different perspective, the fluororubber may be a non-perfluoro fluororubber or a perfluoro fluororubber.

Examples of non-perfluoro fluororubbers include VdF-based fluororubbers, TFE/propylene (Pr)-based fluororubbers, TFE/Pr/VdF-based fluororubbers, ethylene (Et)/HFP-based fluororubbers, Et/HFP/VdF-based fluororubbers, Et/HFP/TFE-based fluororubbers, fluorosilicone-based fluororubbers, and fluorophosphazene-based fluororubbers. These may be used in isolation or as a combination at quantities that do not impair the effect of the present invention. Of these, VdF-based fluororubbers, TFE/Pr-based fluororubbers or TFE/Pr/VdF-based fluororubbers are more preferred from the perspectives of thermal ageing resistance and oil resistance.

The VdF-based fluororubber is a fluororubber having a VdF repeating unit. It is preferable for the above-mentioned VdF-based fluororubber to be such that the VdF repeating units account for not lower than 20 mol % and not higher than 90 mol %, and more preferably not lower than 40 mol % and not higher than 85 mol %, of the total number of moles of VdF repeating units and repeating units derived from other co-monomers. A more preferred lower limit is 45 mol %, and especially 50 mol %, and a more preferred upper limit is 80 mol %.

In addition, co-monomers in the above-mentioned VdF-based fluororubber are not particularly limited as long as copolymerization with VdF is possible, and examples thereof include, for example, fluorine-containing monomers such as TFE, HFP, PAVE, chlorotrifluoroethylene (CTFE), trifluoroethylene, trifluoropropylene, tetrafluoropropylene, pentafluoropropylene, trifluorobutene, tetrafluoroisobutene, hexafluoroisobutene, vinyl fluoride, iodine-containing fluorinated vinyl ethers, and fluorine-containing monomers represented by general formula (2)

$$CH_2=CFR_f \quad (2)$$

(where, $R_f$ is a straight chain or branched chain fluoroalkyl group having 1 to 12 carbon atoms); fluorine-free monomers such as ethylene (Et), propylene (Pr) or an alkyl vinyl ether, monomers having a crosslinkable group (a curing site) and reactive emulsifying agents. One or more of these monomers and compounds may be used.

As the aforementioned PAVE, perfluoro(methylvinylether) (PMVE) and perfluoro(propyl vinyl ether) (PPVE) are more preferred, and PMVE is especially preferred.

In addition, the aforementioned PAVE can be a perfluorovinyl ether represented by the formula: $CF_2=CFOCF_2OR_f^c$ (where, $R_f^c$ is a straight chain or branched chain perfluoroalkyl group having 1 to 6 carbon atoms, acyclic perfluoroalkyl group having 5 to 6 carbon atoms or a straight chain or branched chain perfluorooxyalkyl group having 2 to 6 carbon atoms and containing 1 to 3 oxygen atoms), and for example, $CF_2=CFOCF_2OCF_3$, $CF_2=CFOCF_2OCF_2CF_3$ or $CF_2=CFOCF_2OCF_2CF_2OCF_3$ is preferably used.

The above-mentioned fluorine-containing monomer represented by formula (2) is preferably a monomer in which $R_f$ is a straight chain fluoroalkyl group, and more preferably a monomer in which $R_f$ is a straight chain perfluoroalkyl group. The number of carbon atoms in $R_f$ is preferably 1 to 6.

Examples of the above-mentioned fluorine-containing monomer represented by formula (2) include $CH_2=CFCF_3$, $CH_2=CFCF_2CF_3$, $CH_2=CFCF_2CF_2CF_3$, $CH_2=CFCF_2CF_2CF_2CF_3$, and of these, 2,3,3,3-tetrafluoropropylene, which is represented by $CH_2=CFCF_3$, is preferred.

The above-mentioned VdF-based fluororubber is preferably at least one type of copolymer selected from among the group comprising VdF/HFP copolymers, VdF/TFE/HFP copolymers, VdF/CTFE copolymers, VdF/CTFE/TFE copolymers, VdF/PAVE copolymers, VdF/TFE/PAVE copolymers, VdF/HFP/PAVE copolymers, VdF/HFP/TFE/PAVE copolymers, VdF/TFE/Pr copolymers, VdF/Et/HFP copolymers and copolymers of VdF and fluorine-containing monomers represented by formula (2). Also, the above-mentioned VdF-based fluororubber preferably comprises at least one type of comonomer selected from among the group comprising TFE, HFP and PAVE, as the comonomer other than VdF.

Of these, at least one type of copolymer selected from among the group comprising VdF/HFP copolymers, VdF/TFE/HFP copolymers, copolymers of VdF and fluorine-containing monomers represented by formula (2), VdF/PAVE copolymers, VdF/TFE/PAVE copolymers, VdF/HFP/PAVE copolymers and VdF/HFP/TFE/PAVE copolymers is more preferred.

At least one type of copolymer selected from among the group comprising VdF/HFP copolymers, VdF/HFP/TFE copolymers, copolymers of VdF and fluorine-containing monomers represented by formula (2) and VdF/PAVE copolymers is further preferred, and at least one type of polymer selected from among the group comprising VdF/HFP copolymers, copolymers of VdF and fluorine-containing monomers represented by formula (2) and VdF/PAVE copolymers is even more preferred.

In the case of a VdF/HFP copolymer, the VdF/HFP composition is preferably (45 to 85)/(55 to 15) (mol %), more preferably (50 to 80)/(50 to 20) (mol %), and further preferably (60 to 80)/(40 to 20) (mol %). The VdF/HFP composition is further preferably (50 to 78)/(50 to 22) (mol %).

In the case of a VdF/TFE/HFP copolymer, the VdF/TFE/HFP composition is preferably (30 to 80)/(4 to 35)/(10 to 35) (mol %).

In the case of a VdF/PAVE copolymer, the VdF/PAVE composition is preferably (65 to 90)/(35 to 10) (mol %).

Further, the VdF/PAVE composition with a composition of (50 to 78)/(50 to 22) (mol %) is one of the preferable embodiments.

In the case of a VdF/TFE/PAVE copolymer, the VdF/TFE/PAVE composition is preferably (40 to 80)/(3 to 40)/(15 to 35) (mol %).

In the case of a VdF/HFP/PAVE copolymer, the VdF/HFP/PAVE composition is preferably (65 to 90)/(3 to 25)/(3 to 25) (mol %).

In the case of a VdF/HFP/TFE/PAVE copolymer, the VdF/HFP/TFE/PAVE composition is preferably (40 to 90)/(0 to 25)/(0 to 40)/(3 to 35) (mol %), and more preferably (40 to 80)/(3 to 25)/(3 to 40)/(3 to 25) (mol %).

In the case of a bipolymer of VdF and a fluorine-containing monomer represented by formula (2), it is preferable for the VdF/fluorine-containing monomer (2) unit to be between 85/15 and 20/80 (mol %) and for monomer units other than VdF and the fluorine-containing monomer (2) to account for 0 to 50 mol % of the total quantity of monomer units, and the VdF/fluorine-containing monomer (2) unit molar ratio is more preferably between 80/20 and 20/80. Further, the VdF/fluorine-containing monomer (2) unit with a composition of 78/22 to 50/50 (mol %) is one of the preferable embodiments.

In addition, it is also preferable for the VdF/fluorine-containing monomer (2) unit to be between 85/15 and 50/50 (mol %) and for monomer units other than VdF and the fluorine-containing monomer (2) to account for 1 to 50 mol % of the total quantity of monomer units. Preferred examples of monomer units other than VdF and the fluorine-containing monomer unit (2) include the above-mentioned VdF co-monomers, such as TFE, HFP, PMVE, perfluoroethyl vinyl ether (PEVE), PPVE, CTFE, trifluoroethylene, hexafluoroisobutene, vinyl fluoride, Et, Pr, alkyl vinyl ethers, monomers having a crosslinkable group and reactive emulsifying agents. Of these, PMVE, CTFE, HFP and TFE are more preferred.

A TFE/Pr-based fluororubber means a fluorine-containing copolymer comprising 45 to 70 mol % of TFE and 55 to 30 mol % of Pr. In addition to these two components, this type of fluororubber may contain 0 to 40 mol % of a specific third component (for example, PAVE).

In the case of an Et/HFP copolymer, the Et/HFP composition is preferably (35 to 80)/(65 to 20) (mol %), and more preferably (40 to 75)/(60 to 25) (mol %).

In the case of an Et/HFP/TFE copolymer, the Et/HFP/TFE composition is preferably (35 to 75)/(25 to 50)/(0 to 15) (mol %), and more preferably (45 to 75)/(25 to 45)/(0 to 10) (mol %).

Examples of perfluoro fluororubbers include those comprising TFE/PAVE and the like. The TFE/PAVE composition is preferably (50 to 90)/(50 to 10) (mol %), more preferably (50 to 80)/(50 to 20) (mol %), and further preferably (55 to 75)/(45 to 25) (mol %).

In this case, the PAVE can be PMVE, PPVE and the like, and it is possible to use these in isolation or as an arbitrary combination thereof.

In view of effectively improving the reinforcing properties of the fluororubber composition of the present invention, and the durability at high temperatures of the crosslinked fluororubber article obtainable from the fluororubber composition, the fluororubber (A) is preferably a binary copolymer containing only a VdF unit, and a HFP unit, a polymer unit based on the fluorine-containing monomer represented by the formula (2), or a PAVE unit. That is, the fluororubber (A) is preferably at least one binary copolymer selected from the group consisting of VdF/HFP copolymers, copolymers of VdF and fluorine-containing monomers represented by formula (2), and VdF/PAVE copolymers.

Further, the fluororubber (A) is more preferably at least one binary copolymer selected from the group consisting of VdF/HFP copolymers, VdF/2,3,3,3-tetrafluoropropylene copolymers, and VdF/PAVE copolymers, and particularly preferably at least one binary copolymer selected from the group consisting of VdF/HFP copolymers and VdF/2,3,3,3-tetrafluoropropylene copolymers.

In order to prepare a crosslinked fluororubber article excellent in tensile properties at high temperatures from the fluororubber composition of the present invention, the fluororubber (A) includes a VdF unit and a structural unit (hereinafter, referred to as a "structural unit (a)") derived from at least one monomer selected from the group consisting of HFP, 2,3,3,3-tetrafluoro propylene, and PAVE, and may be a copolymer in which the VdF unit/structural unit (a) (molar ratio) is 50/50 to 90/10. The VdF unit/structural unit (a) (molar ratio) is preferably 52/48 to 85/15 and more preferably 55/45 to 80/20.

The copolymer may include a structural unit derived from a monomer other than the VdF unit and the structural unit (a) in addition to the VdF unit and the structural unit (a), and the amount of the structural unit derived from another monomer in the copolymer is preferably 0 to 40 mol %, more preferably 0 to 30 mol %, still more preferably 0 to 20 mol %, and particularly preferably 0 to 10 mol %, relative to 100 mol % of the total structural units. The copolymer may include a structural unit derived from another monomer, but is preferably a binary copolymer containing no structural unit derived from another monomer, and is preferably a binary copolymer selected from the group consisting of VdF/HFP copolymers, VdF/2,3,3,3-tetrafluoropropylene copolymers, and VdF/PAVE copolymers, and more preferably a binary copolymer selected from the group consisting of VdF/HFP copolymers and VdF/2,3,3,3-tetrafluoropropylene copolymers.

The number average molecular weight (Mn) of the fluororubber (A) is preferably 5,000 to 500,000, more preferably 10,000 to 500,000, and particularly preferably 20,000 to 500,000.

In addition, in cases where, for example, it is necessary for the fluororubber composition to have a low viscosity, the above-mentioned fluororubber (A) may be blended with another fluororubber. Examples of other fluororubbers include low molecular weight liquid fluororubbers (number average molecular weight: 1,000 or higher), low molecular weight fluororubbers having number average molecular weights of approximately 10,000 and fluororubbers having number average molecular weights of approximately 100,000 to 200,000.

From the perspective of processability, the Mooney viscosity at 100° C. of the fluororubber (A) is 20 to 200, and preferably 30 to 180. The Mooney viscosity is measured in accordance with JIS K6300.

The above-mentioned non-perfluoro fluororubbers and perfluoro fluororubbers can be produced using a common method such as emulsion polymerization, suspension polymerization or solution polymerization. In particular, by using a polymerization method that uses an iodine (or bromine) compound, which is known as iodine (or bromine) transfer polymerization, it is possible to produce a fluororubber having a narrow molecular weight distribution.

The materials exemplified as the aforementioned non-perfluoro fluororubbers and perfluoro fluororubbers constitute the primary monomer, and it is possible to preferably use a material obtained by copolymerizing a monomer having a crosslinkable group. A monomer having a crosslinkable group should be one able to introduce a crosslinkable group that is suitable for the production method or crosslinking system, for example a publicly known polymerizable compound or chain transfer agent containing an iodine atom, a bromine atom, a carbon-carbon double bond, a cyano group, a carboxyl group, a hydroxyl group, an amino group, an ester group and the like.

Preferred examples of monomers having crosslinkable groups include a compound represented by General formula (3):

$$CY^1_2=CY^2R_f^2X^1 \quad (3)$$

(where, $Y^1$ and $Y^2$ each denote a fluorine atom, a hydrogen atom or —$CH_3$; $R_f^2$ denotes a straight chain or branched chain fluorine-containing alkylene group which may have one or more ether linkage type oxygen atoms, which may have an aromatic ring and in which some or all of the hydrogen atoms are substituted by fluorine atoms; and $X^1$ denotes an iodine atom or a bromine atom). Specifically, it is possible to use, for example, an iodine-containing monomer or bromine-containing monomer represented by general formula (4):

$$CY^1_2=CY^2R_f^3CHR^1-X^1 \quad (4)$$

(where, $Y^1$, $Y^2$ and $X^1$ are the same as mentioned above, $R_f^3$ denotes a straight chain or branched chain fluorine-containing alkylene group which may have one or more ether linkage type oxygen atoms and in which some or all of the hydrogen atoms are substituted by fluorine atoms, that is, a straight chain or branched chain fluorine-containing alkylene group in which some or all of the hydrogen atoms are substituted by fluorine atoms, a straight chain or branched chain fluorine-containing oxyalkylene group in which some or all of the hydrogen atoms are substituted by fluorine atoms or a straight chain or branched chain fluorine-containing polyoxyalkylene group in which some or all of the hydrogen atoms are substituted by fluorine atoms; and R1 denotes a hydrogen atom or a methyl group), or an iodine-containing monomer or bromine-containing monomer represented by general formulae (5) to (22):

$$CY^4_2=CY^4(CF_2)_n-X^1 \quad (5)$$

(where, the $Y^4$ groups may be the same or different, and are hydrogen atoms or fluorine atoms, and n is an integer between 1 and 8)

$$CF_2=CFCF_2R_f^4-X^1 \quad (6)$$

(where, $$R_f^4 \text{ is } -(OCF_2)_n- \text{ or } -(OCF(CF_3))_n- \quad \text{[Formula 1]}$$

and n is an integer between 0 and 5)

$$CF_2=CFCF_2(OCF(CF_3)CF_2)_m(OCH_2CF_2CF_2)_nOCH_2CF_2-X^1 \quad (7)$$

(where, m is an integer between 0 and 5 and n is an integer between 0 and 5)

$$CF_2=CFCF_2(OCH_2CF_2CF_2)_m(OCF(CF_3)CF_2)_nOCF(CF_3)-X^1 \quad (8)$$

(where, m is an integer between 0 and 5 and n is an integer between 0 and 5)

$$CF_2=CF(OCF_2CF(CF_3))_mO(CF_2)_n-X^1 \quad (9)$$

(where, m is an integer between 0 and 5 and n is an integer between 1 and 8)

$$CF_2=CF(OCF_2CF(CF_3))_m-X^1 \quad (10)$$

(where, m is an integer between 1 and 5)

$$CF_2=CFOCF_2(CF(CF_3)OCF_2)_nCF(-X^1)CF_3 \quad (11)$$

(where, n is an integer between 1 and 4)

$$CF_2=CFO(CF_2)_nOCF(CF_3)-X^1 \quad (12)$$

(where, n is an integer between 2 and 5)

$$CF_2=CFO(CF_2)_n-(C_6H_4)-X^1 \quad (13)$$

(where, n is an integer between 1 and 6)

$$CF_2=CF(OCF_2CF(CF_3))_nOCF_2CF(CF_3)-X^1 \quad (14)$$

(where, n is an integer between 1 and 2)

$$CH_2=CFCF_2O(CF(CF_3)CF_2O)_nCF(CF_3)-X^1 \quad (15)$$

(where, n is an integer between 0 and 5)

$$CF_2=CFO(CF_2CF(CF_3)O)_m(CF_2)_n-X^1 \quad (16)$$

(where, m is an integer between 0 and 5 and n is an integer between 1 and 3)

$$CH_2=CFCF_2OCF(CF_3)OCF(CF_3)-X^1 \quad (17)$$

$$CH_2=CFCF_2OCH_2CF_2-X^1 \quad (18)$$

$$CF_2=CFO(CF_2CF(CF_3)O)_mCF_2CF(CF_3)-X^1 \quad (19)$$

(where, m is an integer of 0 or higher)

$$CF_2=CFOCF(CF_3)CF_2O(CF_2)_n-X^1 \quad (20)$$

(where, n is an integer of 1 or higher)

$$CF_2=CFOCF_2OCF_2CF(CF_3)OCF_2-X^1 \quad (21)$$

$$CH_2=CH-(CF_2)_nX^1 \quad (22)$$

(where, n is an integer between 2 and 8)
(in general formulae (5) to (22), $X^1$ is the same as mentioned above),
and it is possible to use these in isolation or as an arbitrary combination thereof.

The iodine-containing monomer or bromine-containing monomer represented by general formula (4) is preferably an iodine-containing fluorinated vinyl ether represented by general formula (23):

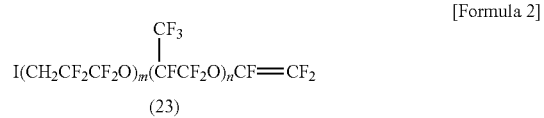

(where, m is an integer between 1 and 5 and n is an integer between 0 and 3).
More specifically, it is possible to use

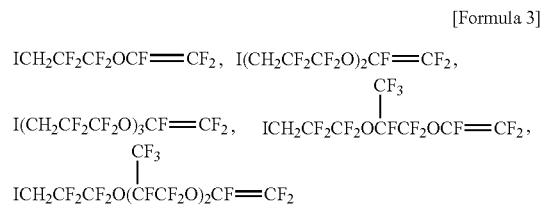

and the like, but of these, $ICH_2CF_2CF_2OCF=CF_2$ is preferred.

Specifically, the iodine-containing monomer or bromine-containing monomer represented by general formula (5) is preferably $ICF_2CF_2CF=CH_2$ or $I(CF_2CF_2)_2CF=CH_2$.

Specifically, the iodine-containing monomer or bromine-containing monomer represented by general formula (9) is preferably $I(CF_2CF_2)_2OCF=CF_2$.

Specifically, the iodine-containing monomer or bromine-containing monomer represented by general formula (22) is preferably $CH_2=CHCF_2CF_2I$ or $I(CF_2CF_2)_2CH=CH_2$.

In addition, a bis-olefin compound represented by the formula:

$$R^2R^3C=CR^4-Z-CR^5=CR^6R^7$$

(where, $R^2$, $R^3$, $R^4$, $R^5$, $R^6$ and $R^7$ may be the same or different, and each denote H or an alkyl group having 1 to 5 carbon atoms, and Z denotes a straight chain or branched-chain alkylene or cycloalkylene group having 1 to 18 carbon atoms, which may contain an oxygen atom and which is preferably at least partially fluorinated, or a (per)fluoropolyoxyalkylene group) is also preferred as a monomer having a crosslinkable group. Moreover, "(per)fluoropolyoxyalkylene group" means "a fluoropolyoxyalkylene group or a perfluoropolyoxyalkylene group" in the present specification.

Z is preferably a (per)fluoroalkylene group having 4 to 12 carbon atoms, and $R^2$, $R^3$, $R^4$, $R^5$, $R^6$ and $R^7$ are preferably hydrogen atoms.

In cases where Z is a (per)fluoropolyoxyalkylene group, a (per)fluoropolyoxyalkylene) fluoropolyoxyalkylene group represented by the formula:

$$-(Q)_p-CF_2O-(CF_2CF_2O)_m-(CF_2O)_n-CF_2-(Q)_p-$$

(where, Q is an alkylene group having 1 to 10 carbon atoms or an oxyalkylene group having 2 to 10 carbon atoms, p is 0 or 1, and m and n are integers such that m/n is 0.2 to 5 and the molecular weight of the (per) fluoropolyoxyalkylene group is 500 to 10,000, and preferably 1,000 to 4,000) is preferred. In this formula, Q is preferably selected from among $-CH_2OCH_2-$ and $-CH_2O(CH_2CH_2O)_sCH_2-$ (s=1 to 3).

Preferred bis-olefins include:

$$CH_2=CH-(CF_2)_4-CH=CH_2,$$

$$CH_2=CH-(CF_2)_6-CH=CH_2, \text{ and}$$

bis-olefins represented by the formula:

$$CH_2=CH-Z^1-CH=CH_2$$

(where, $Z^4$ is $-CH_2OCH_2-CF_2O-(CF_2CF_2O)_m-(CF_2O)_n-CF_2-CH_2OCH_2-$ (m/n=0.5)).

Of these, 3,3,4,4,5,5,6,6,7,7,8,8-dodecafluoro-1,9-decadiene, which is represented by $CH_2=CH-(CF_2)_6-CH=CH_2$, is preferred.

(B) Carbon Black

The fluororubber composition of the present invention includes carbon black (B). Examples of types of a carbon black (B) include furnace black, acetylene black, thermal black, channel black and graphite, and specific examples thereof include SAF-HS ($N_2SA$: 142 $m^2/g$, DBP: 130 ml/100 g), SAF ($N_2SA$: 142 $m^2/g$, DBP: 115 ml/100 g), N234 ($N_2SA$: 126 $m^2/g$, DBP: 125 ml/100 g), ISAF ($N_2SA$: 119 $m^2/g$, DBP: 114 ml/100 g), ISAF-LS ($N_2SA$: 106 $m^2/g$, DBP: 75 ml/100 g), ISAF-HS ($N_2SA$: 99 $m^2/g$, DBP: 129 ml/100 g), N339 ($N_2SA$: 93 $m^2/g$, DBP: 119 ml/100 g), HAF-LS ($N_2SA$: 84 $m^2/g$, DBP: 75 ml/100 g), HAS-HS ($N_2SA$: 82 $m^2/g$, DBP: 126 ml/100 g), HAF ($N_2SA$: 79 $m^2/g$, DBP: 101 ml/100 g), N351 ($N_2SA$: 74 $m^2/g$, DBP: 127 ml/100 g), LI-HAF ($N_2SA$: 74 $m^2/g$, DBP: 101 ml/100 g), MAF-HS ($N_2SA$: 56 $m^2/g$, DBP: 158 ml/100 g), MAF ($N_2SA$: 49 $m^2/g$, DBP: 133 ml/100 g), FEF-HS ($N_2SA$: 42 $m^2/g$, DBP: 160 ml/100 g), FEF ($N_2SA$: 42 $m^2/g$, DBP: 115 ml/100 g), SRF-HS ($N_2SA$: 32 $m^2/g$, DBP: 140 ml/100 g), SRF-HS ($N_2SA$: 29 $m^2/g$, DBP: 152 ml/100 g), and GPF ($N_2SA$: 27 $m^2/g$, DBP: 87 ml/100 g). Among these, SAF-HS, SAF, N234, ISAF, ISAF-LS, ISAF-HS, N339, HAF-LS, HAS-HS, HAF, N351, LI-HAF, and MAF-HS are preferable. These types of a carbon black can be used in isolation or as a combination of two or more types thereof.

Of these, it is preferable for the carbon black to have a nitrogen adsorption specific surface area ($N_2SA$) of 25 to 180 $m^2/g$ and a dibutyl phthalate (DBP) absorption number of 40 to 180 ml/100 g. Moreover, when a carbon black having high $N_2SA$ and DBP values is used, the values for loss elastic modulus (E") and storage elastic modulus (E') of the crosslinked fluororubber article to be obtained mentioned below increase.

If the nitrogen adsorption specific surface area ($N_2SA$) is lower than 25 $m^2/g$, the mechanical properties tend to deteriorate when the carbon black is blended with a rubber, and for this reason, the nitrogen adsorption specific surface area (N2SA) is preferably not lower than 40 $m^2/g$, more preferably not lower than 50 $m^2/g$, even more preferably not lower than 70 $m^2/g$, still more preferably not lower than 90 $m^2/g$, and particularly preferably not lower than 110 $m^2/g$. The upper limit is preferably 180 $m^2/g$ from the perspective of general ease of procurement.

Combination use of a carbon black with a large nitrogen adsorption specific surface area in the above range and an aromatic petroleum resin, particularly a coumarone-indene resin, remarkably improves the reinforcing properties.

If the dibutyl phthalate (DBP) absorption number is lower than 40 ml/100 g, the mechanical properties tend to deteriorate when the carbon black is blended with a rubber, and for this reason, the dibutyl phthalate (DBP) absorption number is not lower than 50 ml/100 g, preferably not lower than 60 ml/100 g, and particularly preferably not lower than 80 ml/100 g. From the perspective of general ease of procurement, the upper limit is preferably 175 ml/100 g, and especially 170 ml/100 g.

It is preferable to blend 5 to 65 parts by mass of the carbon black (B) relative to 100 parts by mass of the fluororubber (A). If the blending quantity of the carbon black (B) is too high or too low, the mechanical properties of the crosslinked article tend to deteriorate. From the perspective of obtaining a good balance of physical properties, the blending quantity of a carbon black is preferably not lower than 6 parts by mass, and more preferably not lower than 10 parts by mass, relative to 100 parts by mass of the fluororubber (A), and is preferably not higher than 55 parts by mass, more preferably not higher than 50 parts by mass, even more preferably not higher than 49 parts by mass, and particularly preferably not higher than 45 parts by mass, relative to 100 parts by mass of the fluororubber (A).

From the perspective of obtaining excellent flexibility, the blending quantity of a carbon black is preferably 5 to 20 parts by mass, more preferably 8 to 18 parts by mass, and still more preferably 10 to 15 parts by mass, relatige to 100 parts by mass of the fluororubber (A). The crosslinked article with a carbon black in the above range is excellent in flexibility, and is therefore particularly suitable for a hose.

Aromatic Petroleum Resin (E)

The fluororubber composition of the present invention can provide a crosslinked article excellent in heat resistance as well as mechanical properties at high temperatures by including an aromatic petroleum resin (E). The fluororubber composition of the present invention including the aromatic petroleum resin (E) can provide a crosslinked article excellent in mechanical properties at high temperatures (tensile strength at break at high temperatures, tensile elongation at break at high temperatures, and durability at high temperatures), and particularly excellent in durability at high temperatures.

The fluororubber composition of the present invention is excellent in reinforcing properties by including the aromatic petroleum resin (E). The reinforcing properties of the fluororubber composition can be determined from the durability (tension fatigue properties) of the crosslinked article prepared by crosslinking of the fluororubber composition.

The aromatic petroleum resin (E) is preferably at least one resin selected from the group consisting of phenol resins, coumarone-indene resins, styrene resins, rosin resins, and dicyclopentadiene (DCPD) resins.

Examples of the phenol resins include phenol terpene resins such as Hitanol 1501 (trade name, Hitachi Chemical Co., Ltd.), Hitanol 1502 (trade name, Hitachi Chemical Co., Ltd.), TAMANOL 510 (trade name, Arakawa Chemical Industries, Ltd.), Tackirol 101 (trade name, Sumitomo Chemical Co., Ltd.), Tackirol 160 (trade name, Sumitomo Chemical Co., Ltd.), Tackirol EP20 (trade name, Sumitomo Chemical Co., Ltd.), Tackirol EP30 (trade name, Sumitomo Chemical Co., Ltd.), SUMILITE resin PR19900 (trade name, Sumitomo Durez), NIKANOL HP70 (trade name, MITSUBISHI GAS CHEMICAL COMPANY, INC.), and PP5121 (trade name, Gunei Chemical Industry Co., Ltd.).

Examples of the styrene resins include a polystyrene resin, an acrylonitrile/butadiene/styrene (ABS) resin, and a styrene/butadiene resin. Specific examples of the polystyrene resin include ESTYRENE (NIPPON STEEL & SUMIKIN CHEMICAL CO., LTD.), HYBRANCH, DICSTYRENE, CLEAPACT, and RYULEX (DIC Corporation), CEVIAN (Daicel Polymer Ltd.), and CLEAREN (DENKI KAGAKU KOGYOKABUSHIKI KAISHA). Specific example of ABS include UMG ABS, BULKSAM, DIALAC (UMG ABS, Ltd.), TOYOLAC (Toray Industries, Inc.), Stylac ABS (Asahi Kasei Chemicals Corporation), ABS (Techno Polymer Co., Ltd.), and Kralastic and SUNTAC (NIPPON A & A INC.). Specific examples of the styrene/butadiene resin include Asaflex (Asahi Kasei Chemicals Corp.) and CLEAREN (DENKI KAGAKU KOGYO KABUSHIKI KAISHA).

Examples of the rosin resins include gum rosin, wood rosin, and tall oil rosin. Specific examples of the tall oil rosin include HARTALL and BANDIS (Harima Chemicals Group, Inc.), and ESTER GUM, SUPER ESTER, PINECRYSTAL, TYLEN, RONDIS, ARADIME, and HYPALE (Arakawa Chemical Industries, Ltd.).

Examples of the dicyclopentadiene (DCPD) resins include EPICLON HP7200 (DIC Corporation), MARUKARETS M series (Maruzen Petrochemical Co., Ltd.), and Quintone 1000 series (ZEON CORPORATION).

The aromatic petroleum resin (E) is preferably a coumarone-indene resin, since the fluororubber composition of the present invention has more excellent reinforcing properties and the crosslinked article obtained from the fluororubber composition has more excellent durability at high temperatures. The coumarone-indene resin and the like were conventionally used as a tackifier. However, they are not used in order to improve the reinforcing properties of the fluororubber composition and the durability of the crosslinked article obtained from the fluororubber composition.

Conventionally known coumarone-indene resins are used as the coumarone-indene resin, and the coumarone-indene resin is specifically a resin composed of a polymer unit based on a compound represented by the formula:

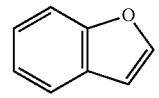

[Formula 4]

and a polymer unit based on a compound represented by the formula:

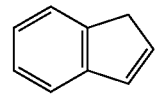

[Formula 5]

The coumarone-indene resin may further be a cumarone-indene-styrene resin composed of a polymer unit based on styrene.

Examples of the coumarone-indene resin include Nitto resin coumarone G-90 (NITTO CHEMICAL CO., LTD.), Process resins AC-8, B-70, and C-75 (KOBE OIL CHEMICAL INDUSTRIAL Co., Ltd.), and Westco CI100 Resins, CI-110L, CI 130 (West RESERVE CHEMICAL CORPORATION).

The softening point of the aromatic petroleum resin (E) is preferably 60° C. or higher and more preferably 70° C. or higher. If the softening point of the aromatic petroleum resin (E) is lower than 50° C., the rubber is likely to adhere tightly to a rotor during mixing of the rubber. The softening point of the aromatic petroleum resin (E) is preferably 160° C. or lower and more preferably 140° C. or lower. If the softening point of the aromatic petroleum resin (E) exceeds 160° C., the hardness of the vulcanised rubber tends to be increased.

The softening point of the aromatic petroleum resin (E) is a value determined in accordance with a ring and ball method.

The fluororubber composition of the present invention has excellent reinforcing properties and the crosslinked article obtained from the fluororubber composition has excellent durability at high temperatures. Therefore, the amount of the aromatic petroleum resin (E) is preferably 0.01 to 20 parts by mass relative to 100 parts by mass of the fluororubber (A). The amount is more preferably 0.01 to 10 parts by mass.

The fluororubber composition of the present invention may include other components as long as the fluororubber (A), the carbon black (B), and the aromatic petroleum resin (E) are included.

Crosslinking agent (C) and crosslinking accelerator (D)

The crosslinking agent (C) and the crosslinking accelerator (D) can be selected as appropriate according to the crosslinking system, the type of fluororubber (A) being crosslinked (for example, the copolymer composition, the presence/absence and type of crosslinkable groups), the specific intended use or mode of use of the obtained crosslinked article, mixing conditions and the like.

The blending quantity of the crosslinking agent (C) is preferably 0.01 to 10 parts by mass, more preferably 0.1 to 9 parts by mass, and particularly preferably 0.2 to 8 parts by mass relative to 100 parts by mass of the fluororubber (A). In terms of the excellent tensile strength at break of the crosslinked article and excellent adhesion property to another material (particularly, silicone, acrylic, acrylonitrilebutadiene rubber and hydrogenated acrylonitrilebutadiene rubber), the blending quantity of the crosslinking agent (C) is preferably 0.5 parts by mass or more, more preferably 1.0 part by mass or more, and still more preferably 2.0 parts by mass or more.

The blending quantity of the cross-linking accelerator (D) is usually 0.01 to 10 parts by mass and preferably 0.1 to 9 parts by mass relative to 100 parts by mass of the fluororubber (A). In terms of the excellent tensile strength at break of the crosslinked article and excellent adhesion property to another material (particularly, silicone, acrylic, acrylonitrilebutadiene rubber and hydrogenated acrylonitrilebutadiene rubber), the blending quantity of the cross-linking accelerator (D) is preferably 0.5 parts by mass or more, more preferably 1.0 part by mass or more, and still more preferably 2.0 parts by mass or more.

The crosslinking system can be, for example, a peroxide crosslinking system, a polyol crosslinking system, a polyamine crosslinking system, an oxazole crosslinking system, a thiazole crosslinking system, an imidazole crosslinking system, a triazine crosslinking system and the like.

(Peroxide Crosslinking System)

When crosslinking by means of a peroxide crosslinking system, because a carbon-carbon bond is present at a crosslinking site, chemical resistance and steam resistance are superior to a polyol crosslinking system, in which a carbon-oxygen bond is present at a crosslinking site, or a polyamine crosslinking system, in which a carbon-nitrogen double bond is present.

A crosslinking agent for a peroxide crosslinking system should be a peroxide capable of readily generating peroxy radicals in the presence of heat or an oxidation-reduction system, and specific examples thereof include organic peroxides such as 1,1-bis(t-butylperoxy)-3,5,5-trimethylcyclohexane, 2,5-dimethylhexane-2,5-dihydroperoxide, di-t-butylperoxide, t-butylcumyl peroxide, dicumyl peroxide, α,α-bis(t-butylperoxy)-p-diisopropylbenzene, α,α-bis(t-butylperoxy)-m-diisopropylbenzene, 2,5-dimethyl-2,5-di(t-butylperoxy)hexane, 2,5-dimethyl-2,5-di(t-butylperoxy)hexyne-3, benzoyl peroxide, t-butylperoxybenzene, t-butylperoxybenzoate, t-butylperoxymaleic acid and t-butylperoxyisopropylcarbonate. Of these, 2,5-dimethyl-2,5-di(t-butylperoxy)hexane and 2,5-dimethyl-2,5-di(t-butylperoxy)hexyne-3 are preferred.

In addition, it is generally preferable to incorporate a crosslinking accelerator in a peroxide crosslinking system. Examples of crosslinking accelerators for peroxide-based crosslinking agents, and especially organic peroxide-based crosslinking agents, include triallyl cyanurate, triallyl isocyanurate (TAIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, N,N-diallylacrylamide, 1,6-divinyldodecafluorohexane, hexaallylphosphoramide, N,N,N',N'-tetraallylphthalamide, N,N,N',N'-tetraallylmaronamide, trivinylisocyanurate, 2,4,6-trivinylmethyltrisiloxane, tri(5-norbornene-2-methylene)cyanurate and triallylphosphite. Of these, triallyl isocyanurate (TAIC) is preferred from the perspectives of crosslinking properties and the physical properties of a crosslinked article.

It is possible to use a crosslinking accelerator having low self polymerization properties as a crosslinking accelerator used in a peroxide crosslinking system. A crosslinking accelerator having low self polymerization properties means a compound having low self polymerization properties, unlike triallyl isocyanurate (TRIC), which is well-known as a crosslinking accelerator.

Examples of crosslinking accelerators having low self polymerization properties include:

trimethallyl isocyanurate (TMAIC), which is represented by

[Formula 6]

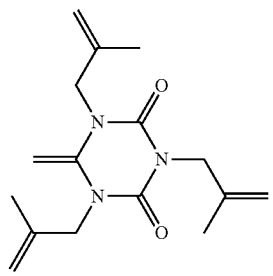

p-quinonedioxime, which is represented by

[Formula 7]

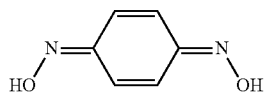

p,p'-dibenzoylquinonedioxime, which is represented by

[Formula 8]

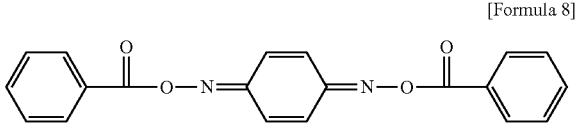

maleimide, which is represented by

[Formula 9]

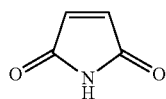

N-phenylene maleimide, which is represented by

[Formula 10]

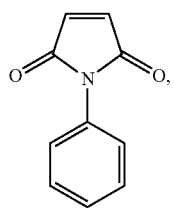

and
N,N'-phenylene bismaleimide, which is represented by

[Formula 11]

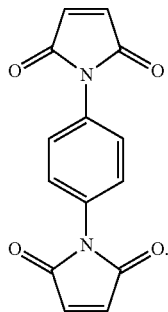

A preferred crosslinking accelerator having low self polymerization properties is trimethallyl isocyanurate (TMAIC).

It is possible to use a bis-olefin as a crosslinking accelerator used in a peroxide crosslinking system.

Examples of bis-olefins able to be used as crosslinking accelerators include bis-olefins represented by the formula:

$R^2R^3C=CR^4-Z-CR^5=CR^6R^7$ (where, $R^2$, $R^3$, $R^4$, $R^5$, $R^6$ and $R^7$ may be the same or different, and each denote H or an alkyl group having 1 to 5 carbon atoms, and Z denotes a linear (straight chain) or branched-chain alkylene or cycloalkylene group having 1 to 18 carbon atoms, which may contain an oxygen atom and which is preferably at least partially fluorinated, or a (per)) fluoropolyoxyalkylene group).

Z is preferably a perfluoroalkylene group having 4 to 12 carbon atoms, and $R^2$, $R^3$, $R^4$, $R^5$, $R^6$ and $R^7$ are preferably hydrogen atoms.

In cases where Z is a (per)fluoropolyoxyalkylene group, a (per)fluoropolyoxyalkylene) fluoropolyoxyalkylene group represented by the formula:

$-(Q)_p-CF_2O-(CF_2CF_2O)_m-(CF_2O)_n-CF_2-(Q)_p-$ (where, Q is an alkylene or oxyalkylene group having 1 to 10 carbon atoms, p is 0 or 1, and m and n are integers such that m/n is 0.2 to 5 and the molecular weight of the (per)fluoropolyoxyalkylene group is 500 to 10,000, and preferably 1,000 to 4,000) is preferred. In this formula, Q is preferably selected from among $-CH_2OCH_2-$ and $-CH_2O(CH_2CH_2O)_sCH_2-$ (s=1 to 3).

Preferred bis-olefins include:

$CH_2=CH-(CF_2)_4-CH=CH_2$, $CH_2=CH-(CF_2)_6-CH=CH_2$, and bis-olefins represented by the formula:

$CH_2=CH-Z^1-CH=CH_2$ (where, $Z^1$ is $-CH_2OCH_2-CF_2O-(CF_2CF_2O)_m-(CF_2O)_n-CF_2-CH_2OCH_2-$ (m/n=0.5)).

Of these, 3,3,4,4,5,5,6,6,7,7,8,8-dodecafluoro-1,9-decadiene, which is represented by $CH_2=CH-(CF_2)_6-CH=CH_2$, is preferred.

In addition, from the perspective of crosslinking properties, a fluororubber that contains iodine atoms and/or bromine atoms as crosslinking sites is preferred as a fluororubber (A) that is suitable for a peroxide crosslinking system. From the perspective of obtaining a good balance of physical properties, the content of iodine atoms and/or bromine atoms is preferably 0.001 to 10 mass %, more preferably 0.01 to 5 mass %, and particularly preferably 0.1 to 3 mass %.

The blending quantity of a peroxide-based crosslinking agent is preferably 0.01 to 10 parts by mass, more preferably 0.1 to 9 parts by mass, and particularly preferably 0.2 to 8 parts by mass, relative to 100 parts by mass of the fluororubber (A). If the blending quantity of the peroxide-based crosslinking agent is lower than 0.01 parts by mass, crosslinking of the fluororubber (A) tends not to progress sufficiently, and if the blending quantity of the peroxide-based crosslinking agent exceeds 10 parts by mass, the balance between physical properties tends to deteriorate.

In addition, the blending quantity of the crosslinking accelerator is generally 0.01 to 10 parts by mass, and preferably 0.1 to 9 parts by mass, relative to 100 parts by mass of the fluororubber (A). If the blending quantity of the crosslinking accelerator is lower than 0.01 parts by mass, there is a tendency for undercuring to occur, and if the blending quantity of the crosslinking accelerator exceeds 10 parts by mass, the balance between physical properties tends to deteriorate.

(Polyol Crosslinking System)

Crosslinking by means of a polyol crosslinking system is preferable due to carbon-oxygen bonds being present at crosslinking sites, the permanent compression set being low and moldability being excellent.

Compounds known in the past as crosslinking agents for fluororubbers can be used as polyol crosslinking agents, and it is preferable to use, for example, a polyhydroxy compound, and especially an aromatic polyhydroxy compound from the perspective of achieving excellent heat resistance.

The above-mentioned aromatic polyhydroxy compound is not particularly limited, and can be, for example, 2,2-bis(4-hydroxyphenyl)propane (hereinafter referred to as "bisphenol A"), 2,2-bis(4-hydroxyphenyl)perfluoropropane (hereinafter referred to as "bisphenol AF"), resorcin, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane (hereinafter referred to as "bisphenol B"), 4,4-bis(4-hydroxyphenyl) valeric acid, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A and 3,3',5,5'-tetrabromobisphenol A. These aromatic polyhydroxy compounds may be in the form of alkali metal salts, alkaline earth metal salts and the like, but in cases where an acid is used to coagulate a copolymer, it is preferable not to use the above-mentioned metal salts.

Of these, polyhydroxy compounds are preferred from the perspective of the obtained crosslinked fluororubber article exhibiting a low permanent compression set and excellent moldability, and aromatic polyhydroxy compounds are more preferred from the perspective of achieving excellent heat resistance, with bisphenol AF being particularly preferred.

In addition, it is generally preferable to incorporate a crosslinking accelerator in a polyol crosslinking system. By using a crosslinking accelerator, it is possible to facilitate a crosslinking reaction due to an intramolecular double bond being generated in a reaction in which hydrofluoric acid is eliminated from the main chain of the fluororubber and addition of the polyhydroxy compound to the generated double bond being facilitated.

Onium compounds are commonly used as crosslinking accelerators for polyol crosslinking systems. The onium compound is not particularly limited, and can be, for example, an ammonium compound such as a quaternary ammonium salt, a phosphonium compound such as a quaternary phosphonium salt, an oxonium compound, a sulfonium compound, a cyclic amine or a monofunctional amine compounds. Of these, quaternary ammonium salts and quaternary phosphonium salts are preferred.

The quaternary ammonium salt is not particularly limited, and can be, for example, 8-methyl-1,8-diazabicyclo[5.4.0]-7-undecenium chloride, 8-methyl-1,8-diazabicyclo[5.4.0]-7-undecenium iodide, 8-methyl-1,8-diazabicyclo[5.4.0]-7-undecenium hydroxide, 8-methyl-1,8-diazabicyclo[5.4.0]-7-undecenium methyl sulfate, 8-ethyl-1,8-diazabicyclo[5.4.0]-7-undecenium bromide, 8-propyl-1,8-diazabicyclo[5.4.0]-7-undecenium bromide, 8-dodecyl-1,8-diazabicyclo[5.4.0]-7-undecenium chloride, 8-dodecyl-1,8-diazabicyclo[5.4.0]-7-undecenium hydroxide, 8-eicosyl-1,8-diazabicyclo[5.4.0]-7-undecenium chloride, 8-tetracosyl-1,8-diazabicyclo[5.4.0]-7-undecenium chloride, 8-benzyl-1,8-diazabicyclo[5.4.0]-7-undecenium chloride (hereinafter referred to as "DBU-B"), 8-benzyl-1,8-diazabicyclo[5.4.0]-7-undecenium hydroxide, 8-phenethyl-1,8-diazabicyclo[5.4.0]-7-undecenium chloride and 8-(3-phenylpropyl)-1,8-diazabicyclo[5.4.0]-7-undecenium chloride. Of these, DBU-B is preferred from the perspectives of crosslinking properties and the physical properties of a crosslinked article.

In addition, the quaternary phosphonium salt is not particularly limited, and can be, for example, tetrabutyl phosphonium chloride, benzyl triphenyl phosphonium chloride (hereinafter referred to as "BTPPC"), benzyl trimethyl phosphonium chloride, benzyl tributyl phosphonium chloride, tributyl allyl phosphonium chloride, tributyl-2-methoxypropyl phosphonium chloride or benzyl phenyl(dimethyl amino)phosphonium chloride. Of these, benzyl triphenyl phosphonium chloride (BTPPC) is preferred from the perspectives of crosslinking properties and the physical properties of a crosslinked article.

In addition, it is possible to use a solid solution of bisphenol AF and a quaternary ammonium salt or quaternary phosphonium salt or the chlorine-free crosslinking accelerator disclosed in Japanese Patent Application Publication No. H11-147891 as a crosslinking accelerator.

The blending quantity of the polyol crosslinking agent is preferably 0.01 to 10 parts by mass, and more preferably 0.1 to 7 parts by mass, relative to 100 parts by mass of the fluororubber (A). If the blending quantity of the polyol crosslinking agent is lower than 0.01 parts by mass, crosslinking of the fluororubber (A) tends not to progress sufficiently, and if the blending quantity of the polyol crosslinking agent exceeds 10 parts by mass, the balance between physical properties tends to deteriorate.

In addition, the blending quantity of the crosslinking accelerator is preferably 0.01 to 8 parts by mass, and more preferably 0.02 to 5 parts by mass, relative to 100 parts by mass of the fluororubber (A). If the blending quantity of the crosslinking accelerator is lower than 0.01 parts by mass, crosslinking of the fluororubber (A) tends not to progress sufficiently, and if the blending quantity of the peroxide-based crosslinking agent exceeds 8 parts by mass, the balance between physical properties tends to deteriorate.

(Polyamine Crosslinking System)

Crosslinking by means of polyamine crosslinking is characterized by a carbon-nitrogen double bond being present at a crosslinking site and excellent dynamic mechanical characteristics being achieved. However, there is a tendency for the permanent compression set to be higher than in cases in which crosslinking is effected by means of a polyol crosslinking system or a peroxide crosslinking system.

Examples of polyamine-based crosslinking agents include polyamine compounds such as hexamethylenediamine carbamate, N,N'-dicinnamylidene-1,6-hexamethylenediamine and 4,4'-bis(aminocyclohexyl) methane carbamate. Of these, N,N'-dicinnamylidene-1,6-hexamethylenediamine is preferred.

The blending quantity of the polyamine-based crosslinking agent is preferably 0.01 to 10 parts by mass, and more preferably 0.2 to 7 parts by mass, relative to 100 parts by mass of the fluororubber (A). If the blending quantity of the polyamine-based crosslinking agent is lower than 0.01 parts by mass, crosslinking of the fluororubber (A) tends not to progress sufficiently, and if the blending quantity of the polyol crosslinking agent exceeds 10 parts by mass, the balance between physical properties tends to deteriorate.

In the present invention, a peroxide crosslinking system or polyol crosslinking system is preferred as the crosslinking system, and it is preferable to use a crosslinking agent (C) that is appropriate for the crosslinking system used. Of these, it is more preferable to use a crosslinking agent for a peroxide crosslinking system.

Common rubber components such as fillers, processing aids, plasticizers, colorants, tackifiers, adhesive aids, acid acceptors, pigments, flame retardants, lubricants, photostabilizers, weathering stabilizers, anti-static agents, ultraviolet radiation absorbers, antioxidants, mold release agents, foaming agents, perfumes, oils, softening agents and other polymers such as polyethylene, polypropylene, polyamides, polyesters and polyurethanes can, if necessary, be blended in the fluororubber composition of the present invention at quantities that do not impair the effect of the present invention.

Examples of fillers include metal oxides such as calcium oxide, titanium oxide, aluminum oxide and magnesium oxide; metal hydroxides such as magnesium hydroxide, aluminum hydroxide and calcium hydroxide; carbonates such as magnesium carbonate, aluminum carbonate, calcium carbonate and barium carbonate; silicates such as magnesium silicate, calcium silicate, sodium silicate and aluminum silicate; sulfates such as aluminum sulfate, calcium sulfate and barium sulfate; synthetic hydrotalcite; metal sulfides such as molybdenum disulfide, iron sulfide and copper sulfide; diatomaceous earth, asbestos, Lithopone (zinc sulfide/barium sulfide), graphite, fluorocarbons, calcium fluoride, coke, fine quartz powder, talc, powdered mica, wollastonite, carbon fibers, aramid fibers, whiskers, glass fibers, organic reinforcing agents, organic fillers, polytetrafluoroethylene, mica, silica, celite and clay. In addition, acid acceptors include calcium oxide, magnesium oxide, lead oxide, zinc oxide, magnesium hydroxide, calcium hydroxide, aluminum hydroxide and hydrotalcite. These may be used in isolation or as a combination of two or more types thereof as appropriate. These may be added at any step in the below-mentioned mixing method, but are preferably added when mixing the fluororubber (A) and the carbon black (B) using an internal mixer or roll kneader.

However, when the crosslinked fluororubber article obtainable from the fluororubber composition containing an acid acceptor is used in high temperatures and under acidic conditions, the crosslinked fluororubber article may be damaged.

Therefore, if the crosslinked fluororubber article is, for example, a turbo charger hose used in high temperatures and under acidic conditions, the fluororubber composition preferably contains no acid acceptor.

Processing aids include higher fatty acids such as stearic acid, oleic acid, palmitic acid and lauric acid; higher fatty acid salts such as sodium stearate and zinc stearate; higher fatty acid amides such as stearic acid amide and oleic acid amide; higher fatty acid esters such as ethyl oleate; petroleum-based waxes such as carnauba wax and ceresin wax; polyglycols such as ethylene glycol, glycerin and diethylene glycol; aliphatic hydrocarbons such as Vaseline and paraffin; silicone-based oils, silicone-based polymers, low molecular weight polyethylene, phthalic acid esters, phosphoric acid esters, rosin, (halogenated) dialkylamines, surfactants, sulfone compounds, fluorine-based additives and organic amine compounds.

Of these, organic amine compounds and acid acceptors are preferred blending components from the perspective of improving the reinforcing properties of the fluororubber composition by being present when the fluororubber (A) and the carbon black (B) are mixed using an internal mixer or an open roll mixer.

Preferred examples of organic amine compounds include primary amines represented by $R^1NH_2$, secondary amines represented by $R^1R^2NH$, and tertiary amines represented by $R^1R^2R^3N$. $R^1$, $R^2$ and $R^3$ may be the same or different, and are each preferably an alkyl group having 1 to 50 carbon atoms, and the alkyl groups may contain a benzene ring as a functional group and may contain a double bond or a conjugated double bond. Moreover, the alkyl groups may be straight chain or branched chain alkyl groups.

Examples of primary amines include coconut amine, octylamine, lauryl amine, stearyl amine, oleyl amine, tallow amine, 17-phenyl-heptadecylamine, octadeca-7,11-dienylamine, octadeca-7,9-dienylamine, octadec-9-enylamine and 7-methyl-octadec-7-enylamine, examples of secondary amines include distearyl amine, and examples of tertiary amines include dimethyloctylamine, dimethyldecylamine, dimethyllaurylamine, dimethylmyristylamine, dimethylpalmitylamine, dimethylstearylamine and dimethylbehenylamine. Of these, amines, and particularly primary amines, having approximately 20 carbon atoms are preferred from the perspectives of ease of procurement and increased reinforcing properties.

It is preferable to blend 0.01 to 5 parts by mass of the organic amine compound relative to 100 parts by mass of the fluororubber (A). If the blending quantity of the organic amine compound is too high, mixing tends to become difficult, and if the blending quantity of the organic amine compound is too low, the reinforcing properties tend to deteriorate. A more preferred blending quantity is not lower than 0.1 parts by mass relative to 100 parts by mass of the fluororubber (A) from the perspective of reinforcing properties of the fluororubber composition and not higher than 4 parts by mass from the perspectives of reinforcing properties and ease of mixing.

Of the acid acceptors mentioned above, metal hydroxides such as calcium hydroxide; metal oxides such as magnesium oxide and zinc oxide; and hydrotalcite are preferred from the perspective of reinforcing properties of the fluororubber composition, with zinc oxide being particularly preferred.

It is preferable to blend 0.01 to 10 parts by mass of the acid acceptor relative to 100 parts by mass of the fluororubber (A). If the blending quantity of the acid acceptor is too high, the physical properties tend to deteriorate, and if the blending quantity of the acid acceptor is too low, the reinforcing properties tend to deteriorate. A more preferred blending quantity is not lower than 0.1 parts by mass relative to 100 parts by mass of the fluororubber (A) from the perspective of reinforcing properties of the fluororubber composition and not higher than 8 parts by mass, and especially not higher than 5 parts by mass, from the perspectives of physical properties and ease of mixing.

The fluororubber composition of the present invention preferably has a difference $\delta G'$ ($G'$ (1%)–$G'$ (100%)) of not lower than 120 kPa and not higher than 3,000 kPa, where $G'$ (1%) denotes a shear modulus at a dynamic strain of 1%, $G'$ (100%) denotes a shear modulus at a dynamic strain of 100%, and $G'$ (1%) and $G'$ (100%) are determined by a dynamic viscoelasticity test with a rubber process analyzer (RPA) in a condition that the measurement temperature is 100° C. and the measurement frequency is 1 Hz.

Difference $\delta G'$ is measured and calculated in a dynamic viscoelasticity test using a rubber process analyzer, in which the reinforcing properties of a fluororubber composition is used as an evaluation parameter.

A fluororubber composition having a difference $\delta G'$ value of not lower than 120 kPa and not higher than 3,000 kPa is advantageous in terms of resting physical properties, mechanical properties at high temperatures and the like.

The difference $\delta G'$ is preferably not lower than 150 kPa, and more preferably not lower than 160 kPa, from the perspective of achieving good resting physical properties, mechanical properties at high temperatures and the like. The difference is still more preferably not lower than 200 kPa, particularly preferably not lower than 300 kPa, more particularly preferably not lower than 400 kPa, and most preferably not lower than 500 kPa because more excellent reinforcing properties can be provided. Difference $\delta G'$ is preferably not higher than 2,800 kPa, and more preferably not higher than 2,500 kPa, from the perspective of achieving good resting physical properties, hardness, viscosity when extrusion molded, mechanical properties at high temperatures and the like.

The fluororubber composition of the present invention can be produced using, for example a mixer or an open roll mixer. Specifically, in order to give a fluororubber composition which can provide a crosslinked article further excellent in mechanical properties at high temperatures, it is preferably produced by the following production method (1).

The production method (1) includes a step (1-1) of mixing the fluororubber (A), the carbon black (B), and the aromatic petroleum resin (E) with an internal mixer or an open roll mixer until the maximum temperature reaches 80 to 220° C. so as to obtain an intermediate composition; a step (1-2) of cooling the intermediate composition to a temperature of lower than 50° C.; and a step (2-1) of mixing the cooled intermediate composition until the maximum temperature reaches not lower than 10° C. but lower than 80° C. so as to obtain a fluororubber composition.

Step (1-1) is a step of mixing the fluororubber (A), the carbon black (B), and the aromatic petroleum resin (E) by means of an internal mixer or an open roll mixer until the maximum temperature reaches 80 to 220° C. so as to obtain an intermediate composition.

Step (1-1) is characterized by mixing the fluororubber (A), the carbon black (B), and the aromatic petroleum resin (E) at a high temperature. By including step (1-1), it is possible to produce a fluororubber composition that can give a crosslinked fluororubber article having excellent mechanical properties at high temperatures.

The mixing in step (1-1) is carried out using an internal mixer or an open roll mixer. The mixing in step (1-1) is preferably carried out using an internal mixer because the mixing can be performed at high temperatures. Examples of internal mixers include tangential internal mixers such as Banbury mixers, meshing type internal mixers such as intermixers, pressurizing mixers, single screw mixers and twin screw mixers.

When using an internal mixer, the average shear rate of the rotor is preferably 20 to 1000 (1/sec), more preferably 50 to 1000 (1/sec), yet more preferably 100 to 1000 (1/sec), further preferably 200 to 1000 (1/sec), and particularly preferably 300 to 1000 (1/sec).

The average shear rate (1/sec) is calculated using the following expression.

$$\text{Average shear rate}(1/\text{sec}) = (\pi \times D \times R)/(60(\text{sec}) \times c)$$

(in the expression,
- D is the diameter of the rotor or the diameter of the roll (cm)
- R is the rate of rotation (rpm)
- c is the chip clearance (cm. This is the gap distance between the rotor and the casing or between the rolls)

It is possible to further mix the crosslinking agent (C) and/or the crosslinking accelerator (D) in step (1-1). In cases where the crosslinking agent is a polyol-based crosslinking agent in particular, it is preferable to further mix the crosslinking agent (C) and/or the crosslinking accelerator (D) in step (1-1). It is possible to place the fluororubber (A), the carbon black (B), and the aromatic petroleum resin (E), and the crosslinking agent (C) and/or crosslinking accelerator (D) simultaneously in an internal mixer or an open roll mixer and then carry out mixing; it is also possible to mix the fluororubber, and the crosslinking agent (C) and/or crosslinking accelerator (D) and then mix the carbon black (B) and the aromatic petroleum resin (E); or it is also possible to mix the fluororubber and the aromatic petroleum resin (E) and then mix the carbon black (B), and the crosslinking agent (C) and/or crosslinking accelerator (D).

In addition, it is preferable to further mix an organic amine compound and/or an acid acceptor in step (1-1).

The mixing in step (1-1) is carried out until the maximum temperature of the mixed materials reaches 80 to 220° C. The above-mentioned mixing is preferably carried out until the maximum temperature reaches 120° C. or higher, and more preferably until the maximum temperature reaches 200° C. or lower. The above-mentioned maximum temperature can be determined by measuring the temperature of the mixed materials immediately after being discharged from the mixer.

In the production method (1), step (1-2) is a step in which the intermediate composition obtained in step (1-1) is cooled to a temperature of lower than 50° C. The intermediate composition obtained in step (1-1) has a temperature of 80 to 220° C., but by carrying out step (2-1) after a sufficiently cooling the intermediate composition, it is possible to produce a fluororubber composition that gives a crosslinked fluororubber article having excellent mechanical properties at high temperatures. In step (1-2), it is preferable for the cooling to be carried out so that the entire intermediate composition reaches a temperature within the above-mentioned range. The lower limit of the cooling temperature is not particularly limited, but may be 10° C.

In step (1-2), it is preferable to carry out the cooling while mixing the intermediate composition using an open roll mixer.

Step (1-1) and step (1-2) may be repeated any number of times. If step (1-1) and step (1-2) are carried out repeatedly, it is preferable for the intermediate composition to be mixed until the maximum temperature reaches 120 to 220° C., and more preferably mixed until the maximum temperature reaches 120 to 140° C., in step (1-1) and step (1-2). If step (1-1) and step (1-2) are carried out repeatedly, the mixing may be carried out using an internal mixer or an open roll mixer, and is preferably carried out using an internal mixer.

When using an open roll mixer, the average shear rate of the rotor is preferably 20 (1/sec) or higher, more preferably 50 (1/sec) or higher, yet more preferably 100 (1/sec) or higher, further preferably 200 (1/sec) or higher, particularly preferably 300 (1/sec) or higher, and preferably 1000 (1/sec) or lower.

The production method (1) of the present invention preferably includes a step of supplying the fluororubber (A), the carbon black (B), and the aromatic petroleum resin (E) in an internal mixer or an open roll mixer, preferably in an internal mixer. During the step, the crosslinking agent (C) and/or crosslinking accelerator (D) may be supplied, and an organic amine compound and/or an acid acceptor may be supplied.

Step (1-1) may include a step in which arbitrary additives are introduced up to the point at which the intermediate composition is discharged. One or more of these additives may be used. These additives may be introduced one or more times. In cases where two or more types of additive are introduced, the additives may be introduced simultaneously or separately. In addition, a single additive may be introduced a plurality of times. The "step in which arbitrary additives are introduced up to the point at which the intermediate composition is discharged" can be, for example, a step in which a carbon black (B') that is different from the carbon black (B) initially introduced in step (1-1) is introduced up to the point at which the intermediate composition is discharged.

In cases where step (1-1) and step (1-2) are repeated also, each of steps (1-1) may include the above-mentioned "step in which arbitrary additives are introduced up to the point at which the intermediate composition is discharged". For example, in a second step (1-1), it is possible to further introduce a carbon black (B') that is different from the carbon black (B) used in the first step (1-1). Further, in a second step (1-1), it is possible to further introduce an aromatic petroleum resin (E).

In the production method (1) of the present invention, step (2-1) is a step in which a fluororubber composition is obtained by mixing the cooled intermediate composition obtained in step (1-2).

Step (2-1) is a step in which the sufficiently cooled intermediate composition obtained in step (1-2) is further mixed, and is an important step in order to improve the high-temperature mechanical properties of a crosslinked fluororubber article.

It is preferable for the mixing in step (2-1) to be carried out until the maximum temperature of the composition reaches not lower than 10° C. but lower than 80° C. If the maximum temperature of the composition during the mixing becomes too high, there are concerns that it will not be possible to obtain a fluororubber composition able to give a crosslinked fluororubber article having excellent mechanical properties at high temperatures.

Step (2-1) may include a step in which different cooled intermediate compositions obtained in step (1-2) are mixed together. In such cases, the mixing should be carried out until the maximum temperature of the mixture of different intermediate compositions reaches not lower than 10° C. but lower than 80° C.

The production method (1) of the present invention preferably further includes, after step (2-1), a step (2-2) in which step (2-1) is repeated m−1 times (m is an integer of 2 or higher). By carrying out step (2-1) a total of two or more times, it is possible to stably produce a fluororubber composition that can produce a crosslinked fluororubber article having excellent mechanical properties at high temperatures. The above-mentioned m is preferably an integer of 5 or higher, more preferably an integer of 10 or higher, further preferably an integer of 30 or higher, and particularly preferably an integer of 50 or higher. In each of steps (2-2), it is preferable to include a step in which the intermediate composition is cooled before mixing.

The mixing in step (2-1) and step (2-2) can be carried out using the above-mentioned internal mixer or open roll mixer.

It is preferable for step (2-1) and step (2-2) to be steps in which the intermediate composition is mixed by being introduced into an open roll mixer and then tight milled.

FIG. 1 is a schematic view showing a method for mixing by tight milling. As shown in FIG. 1(a), the intermediate composition is introduced into an open roll 10 provided with a first roll 11 and a second roll 12. The first roll 11 and the second roll 12 rotate at different speeds in the directions indicated by the arrows. The introduced intermediate composition is rolled into a sheet by being passed between the first roll 11 and the second roll 12 while being subjected to a shearing force, as shown in FIG. 1(b), after which the rolled composition is wound at an arbitrary location, as shown in FIG. 1(c).

From the perspective of obtaining a fluororubber composition able to give a crosslinked fluororubber article having excellent mechanical properties at high temperatures, it is preferable for step (2-1) and step (2-2) to be carried out so that the ratio (P/Q), which is obtained by dividing the values (P) of G' (1%)/G' (100%) of the fluororubber composition obtained in step (2-1) and the fluororubber composition obtained in step (2-2) by the value (Q) of G' (1%)/G' (100%) of the intermediate composition obtained in step (1-2) to both be 0.3 to 1.5, more preferably 1.3 or lower, even more preferably 1.0 or lower, particularly preferably lower than 1.0, and especially 0.9 or lower.

The shear modulus at a dynamic strain of 1% (G' (1%)) and the ratio (G' (1%)/G' (100%)) of the shear modulus (G' (1%)) to the shear modulus at a dynamic strain of 100% (G' (100%)) can be calculated from the dynamic viscoelasticity, which is measured using a rubber process analyzer (RPA 2000, manufactured by Alpha Technologies) under conditions of 100° C. and 1 Hz after preheating for 1 minute at 100° C.

It is possible to improve the mechanical properties of a crosslinked article at high temperatures even by tight milling just once, but in order to achieve superior mechanical properties at high temperatures, it is preferable to carry out the above-mentioned type milling a total of m times (m is an integer of 2 or higher). The above-mentioned m is preferably an integer of 5 or higher, more preferably an integer of 10 or higher, further preferably an integer of 30 or higher, and particularly preferably an integer of 50 or higher.

It is preferable for the above-mentioned production method to further include a step of mixing the crosslinking agent (C) and/or the crosslinking accelerator (D) with the fluororubber composition obtained in step (2-1) or step (2-2). As mentioned above, it is possible to further mix the crosslinking agent (C) and/or the crosslinking accelerator (D) in step (1-1). Incases where the crosslinking system is a peroxide crosslinking system, it is preferable to mix the crosslinking agent (C) and the crosslinking accelerator (D) with the fluororubber composition obtained in step (2-1) or step (2-2) without mixing the crosslinking agent (C) and the crosslinking accelerator (D) in step (1-1).

It is possible to simultaneously mix the crosslinking agent (C) and the crosslinking accelerator (D), but it is also possible to first mix the crosslinking accelerator (D) and then mix the crosslinking agent (C). When mixing is carried out in step (1-1), the mixing conditions for the crosslinking agent (C) and the crosslinking accelerator (D) are the same as the conditions in the above-mentioned step (1-1), except that the maximum temperature during the mixing is not higher than 130° C. Of these, it is preferable to carry out the mixing using an open roll, internal mixer and the like, whereby the average rate of rotation of the rotor is not lower than 20 (1/sec), preferably not lower than 50 (1/sec), more preferably not lower than 100 (1/sec), even more preferably not lower than 200 (1/sec), and particularly preferably not lower than 300 (1/sec). In cases where the crosslinking agent (C) and/or the crosslinking accelerator (D) are mixed with the fluororubber composition obtained in step (2-1) or step (2-2), it is preferable to carry out the mixing so that the maximum temperature is lower than 130° C.

In addition to the production method (1), the following production method (2) may also be employable, for example.

The production method (2) includes: supplying the fluororubber (A), the carbon black (B), the aromatic petroleum resin (E), and optionally an organic amine compound and/or an acid acceptor in predetermined amounts to an internal mixer or an open roll mixer; and mixing the contents under the conditions: an average shear rate of a rotor is not lower than 20 (1/sec), preferably not lower than 50 (1/sec), more preferably not lower than 100 (1/sec), even more preferably not lower than 200 (1/sec), and particularly preferably 300 (1/sec), and the maximum temperature Tm during the mixing is 80 to 220° C. (preferably 120 to 200° C.). The mixing in the production method (2) is preferably carried out using an internal mixer because the mixing can be performed at high temperatures.

The fluororubber composition obtained by the production method (2) does not contain a crosslinking agent (C), a crosslinking accelerator (D), and the like. Further, the mixing of the production method (2) may be repeatedly carried out. In the case of mixing repeatedly, mixing conditions after the first mixing may be the same as the conditions in the production method (2), except that the maximum temperature Tm during the mixing is set at 140° C. or lower.

One method for preparing the fluororubber composition of the present invention based on the production method (2) is, for example, a method including blending and mixing the fluororubber composition obtained by carrying out the production method (2) or repeatedly carrying out the production method (2) with a crosslinking agent (C) and/or a crosslinking accelerator (D).

It is possible to simultaneously mix the crosslinking agent (C) and the crosslinking accelerator (D), and it is also possible to first mix the crosslinking accelerator (D) and then mix the crosslinking agent (C). The mixing conditions for the crosslinking agent (C) and the crosslinking accelerator (D) are the same as the conditions in the production method (2), except that the maximum temperature Tm during the mixing is not higher than 130° C.

Another method for preparing the fluororubber composition of the present invention is, for example, a method including introducing a fluororubber (A), a carbon black (B), an aromatic petroleum resin (E), the crosslinking agent (C) and/or the crosslinking accelerator (D) in predetermined amounts in proper order into an open roll mixer and mixing under the conditions that an average shear rate of a rotor is not lower than 20 (1/sec), preferably not lower than 50 (1/sec), more preferably not lower than 100 (1/sec), even more preferably not lower than 200 (1/sec), particularly preferably not lower than 300 (1/sec), and the maximum temperature Tm during the mixing is 130° C. or lower.

In the case of the polyol-based crosslinking agent, a uniform dispersion prepared by preliminary mixing the fluororubber (A), the crosslinking agent (C), and the crosslinking accelerator (D) may be used. For example, firstly, the fluororubber (A), the polyol-based crosslinking agent, and the crosslinking accelerator are mixed, and then the carbon black (B), the aromatic petroleum resin (E), and the organic amine compound described below are blended and mixed at the maximum temperature Tm during the mixing of 80 to 220° C. Finally, an acid acceptor is blended and mixed at the maximum temperature Tm during the mixing of 130° C. or lower. The mixing is preferably performed at an average shear rate of a rotor of not lower than 20 (1/sec) (preferably not lower than 50 (1/sec), more preferably not lower than 100 (1/sec), even more preferably not lower than 200 (1/sec), and particularly preferably not lower than 300 (1/sec)).

By crosslinking the fluororubber composition of the present invention, it is possible to obtain a crosslinked fluororubber article.

The method for crosslinking the fluororubber composition should be selected as appropriate, but can be, for example, a molding method such as extrusion molding or molding by wrapping and steaming or an ordinary crosslinking method such as a crosslinking method that uses a crosslinking jacket and the like. In addition, in cases where secondary crosslinking is required due to the intended use of the crosslinked article, oven crosslinking may be carried out.

In addition, the crosslinked fluororubber article achieves particularly excellent resting physical properties and mechanical properties at high temperatures when the loss elastic modulus (E") is not lower than 400 kPa and not higher than 6,000 kPa in a dynamic viscoelasticity test (measurement mode: tensile, chuck gap: 20 mm, tensile strain: 1%, measurement frequency: 10 Hz, static tension value when the static load conditions are a constant force during strain dispersion: 157 cN, measurement temperature: 160° C.).

The lower limit of the loss elastic modulus is preferably 420 kPa, and more preferably 430 kPa, and the upper limit of the loss elastic modulus is preferably 5,900 kPa, and more preferably 5,800 kPa.

In addition, from the perspective of improving mechanical properties at high temperature, it is preferable for the crosslinked fluororubber article to exhibit a storage elastic modulus (E') of not lower than 1,500 kPa and not higher than 20,000 kPa in a dynamic viscoelasticity test (measurement mode: tensile, chuck gap: 20 mm, measurement temperature: 160° C., tensile strain: 1%, static tension value when the static load conditions are a constant force during strain dispersion: 157 cN, measurement frequency: 10 Hz). The lower limit of the storage elastic modulus is preferably 1,600 kPa, and more preferably 1,800 kPa, and the upper limit of the storage elastic modulus is preferably 19,000 kPa, and more preferably 18,000 kPa.

In addition, in order to be suitable for use in high-temperature environments, it is preferable for the crosslinked fluororubber article to exhibit a tensile elongation at break at 160° C. of 100 to 700%, more preferably not lower than 110% and even more preferably not lower than 120%, and more preferably not higher than 680% and even more preferably not higher than 650%.

In addition, in order to be suitable for use in high-temperature environments, it is preferable for the crosslinked fluororubber article to exhibit a tensile strength at break at 160° C. of not lower than 1 MPa, more preferably not lower than 1.5 MPa, and particularly preferably not lower than 2 MPa, and preferably not higher than 30 MPa, and more preferably not higher than 28 MPa. The tensile strength at break and tensile elongation at break are measured in accordance with JIS-K 6251 using a No. 6 dumbbell.

In addition, in order to be suitable for use in high-temperature environments, it is preferable for the crosslinked fluororubber article to exhibit a tearing strength at 160° C. of 3 to 30 kN/m, more preferably not lower than 4 kN/m and even more preferably not lower than 5 kN/m, and more preferably not higher than 29 kN/m, and even more preferably not higher than 28 kN/m.

In addition, in order to be suitable for use in high-temperature environments, it is preferable for the crosslinked fluororubber article to exhibit a tensile elongation at break at 200° C. of 100 to 700%, more preferably not lower than 110% and even more preferably not lower than 120%, and more preferably not higher than 680% and even more preferably not higher than 650%.

In addition, in order to be suitable for use in high-temperature environments, it is preferable for the crosslinked fluororubber article to exhibit a tensile strength at break at 200° C. of 1 to 30 MPa, more preferably not lower than 1.5 MPa, and particularly preferably not lower than 2 MPa, and preferably not higher than 29 MPa, and more preferably not higher than 28 MPa.

In addition, in order to be suitable for use in high-temperature environments, it is preferable for the crosslinked fluororubber article to exhibit a tearing strength at 200° C. of 3 to 30 kN/m, more preferably not lower than 4 kN/m and even more preferably not lower than 5 kN/m, and more preferably not higher than 29 kN/m, and even more preferably not higher than 28 kN/m.

The above-mentioned fluororubber composition and the above-mentioned crosslinked fluororubber article can be used in a variety of applications, but can be used particularly advantageously in the various applications mentioned below.

(1) Hoses

The hose may be a hose having a single layer structure comprising only a crosslinked fluororubber article obtained by crosslinking the fluororubber composition of the present invention, but may also be a multilayer hose having a multilayer structure also containing other layers.

Examples of hoses having single layer structures or multilayer structures include exhaust gas hoses, EGR hoses, turbocharger hoses, fuel hoses, brake hoses and oil hoses.

Turbocharger systems are often installed in diesel engines, and are systems whereby exhaust gas from the engine cause a turbine to rotate, thereby driving a compressor that is linked to the turbine, increasing the compression ratio of the air supplied to the engine and increasing the power output of the engine. This type of turbocharger system, which uses exhaust gas from the engine and achieves a high power output, leads to a reduction in engine size, lower fuel consumption and purification of exhaust gas.

Turbocharger hoses are used in turbocharger systems as hoses for supplying compressed air to the engine. In order to effectively use the space in cramped engine compartments, rubber hoses having excellent flexibility and softness are useful, and it is typical to use hoses having multilayer structures in which a rubber (and especially a fluororubber) layer having excellent thermal ageing resistance and oil resistance is used as an inner layer and a silicone rubber or acrylic rubber is used as an outer layer. However, the space around the engine, such as the engine compartment, is subjected to high temperatures and is a harsh environment in which vibration occurs, meaning that it is essential to use a hose that exhibits not only excellent thermal ageing resistance, but also excellent mechanical properties at high temperatures.

By using a crosslinked fluororubber layer obtained by crosslinking the fluororubber composition of the present invention as a rubber layer in a single layer structure or multilayer structure, it is possible to provide a turbocharger hose which can easily satisfy these required properties and which exhibits excellent properties.

In hoses having multilayer structures other than turbocharger hoses, examples of layers comprising other materials include layers comprising other types of rubber, layers comprising thermoplastic resins, fiber reinforcing layers and metal foil layers.

In cases where chemical resistance and softness are particularly required, the other type of rubber is preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers, EPDM and acrylic rubbers, and more preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers and epichlorohydrin rubbers.

In addition, the thermoplastic resin is preferably at least one type of thermoplastic resin selected from among the group comprising fluororesins, polyamide-based resins, polyolefin-based resins, polyester-based resins, poly(vinyl alcohol)-based resins, poly(vinyl chloride)-based resins and poly(phenylene sulfide)-based resins, and more preferably at least one type of thermoplastic resin selected from among the group comprising fluororesins, polyamide-based resins, poly(vinyl alcohol)-based resins and poly(phenylene sulfide)-based resins.

In addition, when producing a hose having a multilayer structure, surface treatment may be carried out if necessary. This surface treatment is not particularly limited as long as the surface treatment enables adhesion, and can be, for example, discharge treatment such as plasma discharge treatment or corona discharge treatment or wet type metallic sodium/naphthalene treatment. In addition, primer treatment is also preferred as a surface treatment. Primer treatment can be carried out using a conventional method. When carrying out primer treatment, it is possible to treat the surface of a fluororubber that has not been subjected to a surface treatment, but it is more effective to carry out primer treatment after carrying out plasma discharge treatment, corona discharge treatment or treatment using metallic sodium/naphthalene.

A hose including a crosslinked fluororubber layer obtainable by crosslinking the fluororubber composition of the present invention particularly needs to have excellent flexibility at room temperature for easy attachment of the hose on a metallic pipe.

The hose of the present invention in which the fluororubber composition includes 5 to 20 parts by mass of the carbon black (B) relative to 100 parts by mass of the fluororubber (A) is excellent in heat resistance and mechanical properties at high temperatures, and is further excellent in flexibility (low hardness) at room temperature.

The amount of the carbon black (B) is more preferably 8 to 18 parts by mass and still more preferably 10 to 15 parts by mass relative to 100 parts by mass of the fluororubber (A).

The above-mentioned hoses can be advantageously used in the fields such as those mentioned below.

The above-mentioned hoses can be used in hoses for CVD apparatuses exposed to high-temperature environments, dry etching apparatuses, wet etching apparatuses, oxidation diffusion apparatuses, sputtering apparatuses, ashing apparatuses, washing apparatuses, ion injection apparatuses, exhaust apparatuses and the like in fields relating to semiconductor manufacturing, such as semiconductor manufacturing apparatuses, liquid crystal panel manufacturing apparatuses, plasma panel manufacturing apparatuses, plasma address liquid crystal panels, field emission display panels and solar cell substrates.

In the automotive field, the above-mentioned hoses can be used in peripheral equipment for engines and automatic transmissions, and can be used as EGR hoses, exhaust gas hoses, fuel hoses, oil hoses and brake hoses in addition to turbocharger hoses.

In addition, the above-mentioned hoses can also be used in fields such as aviation, rockets, ships, chemical plants, analytical/scientific instruments, food processing plant equipment and atomic power plant equipment.

(2) Sealing Materials

When used as a sealing material, the above-mentioned crosslinked fluororubber article can be advantageously used in fields such as those mentioned below.

For example, the above-mentioned crosslinked fluororubber article can be used in sealing materials such as gaskets and contact or non-contact packing materials, which require heat resistance, oil resistance, fuel oil resistance, resistance to anti-freeze used for engine cooling and steam resistance, in engine bodies, main driving systems, valve systems, lubricating/cooling systems, fuel systems, air intake/discharge systems for automotive engines; transmission systems for drive systems; chassis steering systems; braking systems; basic electrical components of electrical equipment, electrical components of control systems, electrical components of accessories and the like (self-sealing packing, piston rings, split ring type packing, mechanical seals, oil seals and the like).

Sealing materials used in engine bodies for automotive engines are not particularly limited, but can be, for example, sealing materials such as cylinder head gaskets, cylinder head cover gaskets, oil pan packing, ordinary gaskets, O-rings, packing and timing belt cover gaskets.

Sealing materials used in main driving systems for automotive engines are not particularly limited, but can be, for example, crankshaft seals or camshaft seals.

Sealing materials used in valve systems for automotive engines are not particularly limited, but can be, for example, valve system oil seals for engine valves and valve seats for butterfly valves.

Sealing materials used in lubricating/cooling systems for automotive engines are not particularly limited, but can be, for example, sealing gaskets for engine oil coolers.

Sealing materials used in fuel systems for automotive engines are not particularly limited, but can be, for example, oil seals for fuel pumps, filler seals for fuel tanks, tank packing and the like, connector O-rings for fuel tubes and the like, injector concussion rings for fuel injection systems, injector seal rings, injector O rings and the like, flange gaskets for carburetors and the like, EGR sealing materials and the like.

Sealing materials used in air intake/discharge systems for automotive engines are not particularly limited, but can be, for example, intake manifold packing, exhaust manifold packing, throttle body packing and turbocharger turbine shaft packing.

Sealing materials used in transmission systems for automotive engines are not particularly limited, but can be, for example, transmission-related bearing seals, oil seals, O-rings and packing and the like, and O-rings and packing for automatic transmission systems.

Sealing materials used in automotive braking systems are not particularly limited, but can be, for example, oil seals, O-rings, packing and the like, piston cups (rubber cups) for master cylinders and the like, caliper seals, boots and the like.

Sealing materials used in automotive electrical components are not particularly limited, but can be, for example, O-rings and packing for vehicle air conditioning systems.

Sealing materials are particularly suitable as sealing materials for sensors (bushes), and especially sealing materials for oxygen sensors, sealing materials for nitrogen oxide sensors, sealing materials for sulfur oxide sensors and the like. O-rings may also be square rings.

Applications in fields other than the automotive field are not particularly limited, and the sealing material can be widely used in fields such as aviation, rockets, ships, oil well drilling (for example, packer seals, MWD seals, LWD seals and the like), chemical plants, pharmaceutical applications, photographic applications such as developers, printing applications such as printing equipment, coating applications such as coating equipment, analytical/scientific instruments, food processing plant equipment, atomic power plant equipment, iron and steel-related applications such as iron plate processing equipment, general industrial applications, electrical applications, fuel cells, electronic components and molding applications such as on-site construction molds.

For example, the sealing material can be oil-resistant, chemical-resistant, heat-resistant, steam-resistance or weathering-resistant packing, O-rings or other sealing materials in transport-related fields such as shipping or aviation; similar packing, O-rings or sealing materials in the field of oil well drilling; similar packing, O-rings or sealing materials in the field of chemical plants; similar packing, O-rings or sealing materials in the fields of food processing plant equipment and food processing equipment (including domestic equipment); similar packing, O-rings or sealing materials in the field of atomic power plant equipment; and similar packing, O-rings or sealing materials in the field of general industrial equipment.

(3) Belts

The above-mentioned crosslinked fluororubber article can be advantageously used in belts such as those mentioned below.

It is possible to use the fluororubber composition of the present invention in a belt material for a power transmission belt (including a flat belt, V-belt, V-ribbed belt, toothed belt and the like) or conveyor belt. In addition, the above-mentioned crosslinked fluororubber article can be used in belt materials for CVD apparatuses exposed to high-temperature environments, dry etching apparatuses, wet etching apparatuses, oxidation diffusion apparatuses, sputtering apparatuses, ashing apparatuses, washing apparatuses, ion injection apparatuses, exhaust apparatuses and the like in fields relating to semiconductor manufacturing, such as semiconductor manufacturing apparatuses, liquid crystal panel manufacturing apparatuses, plasma panel manufacturing apparatuses, plasma address liquid crystal panels, field emission display panels and solar cell substrates.

Examples of flat belts include flat belts used in high-temperature locations, such as around engines in agricultural equipment, machine tools, industrial equipment and the like. Examples of conveyor belts include conveyor belts used to transport loose materials or granular materials, such as coal, crushed stone, sand, mineral ores and wood chips, in high-temperature environments, conveyor belts used in furnaces in ironworks and the like, and conveyor belts used in applications where exposure to high-temperature environments occurs, such as precision instrument assembly plants, food processing plants and the like. Examples of V-belts and V-ribbed belts include V-belts and V-ribbed belts used in agricultural equipment, general equipment (office automation equipment, printing equipment, industrial dryers and the like) and automotive applications. Examples of toothed belts include toothed belts used in drive belts for delivery robots and drive belts for food processing equipment, machine tools and the like, and toothed belts used in automotive applications, office automation equipment, medical applications, printing equipment and the like. In particular, timing belts are examples of automotive toothed belts.

Moreover, in belt materials having multilayer structures, examples of layers comprising other materials include layers comprising other types of rubber, layers comprising thermoplastic resins, fiber reinforcing layers, canvas and metal foil layers.

In cases where chemical resistance and softness are particularly required, the other type of rubber is preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers, EPDM and acrylic rubbers, and more preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers.

In addition, the thermoplastic resin is preferably at least one type of thermoplastic resin selected from among the group comprising fluororesins, polyamide-based resins, polyolefin-based resins, polyester-based resins, poly(vinyl alcohol)-based resins, poly(vinyl chloride)-based resins and poly(phenylene sulfide)-based resins, and more preferably at least one type of thermoplastic resin selected from among the group comprising fluororesins, polyamide-based resins, poly(vinyl alcohol)-based resins and poly(phenylene sulfide)-based resins.

In addition, when producing a belt material having a multilayer structure, surface treatment may be carried out if necessary. This surface treatment is not particularly limited as long as the surface treatment enables adhesion, and can be, for example, discharge treatment such as plasma discharge treatment or corona discharge treatment or wet type metallic sodium/naphthalene treatment. In addition, primer treatment is also preferred as a surface treatment. Primer treatment can be carried out using a conventional method. When carrying out primer treatment, it is possible to treat the surface of a fluororubber that has not been subjected to a surface treatment, but it is more effective to carry out primer treatment after carrying out plasma discharge treatment, corona discharge treatment or treatment using metallic sodium/naphthalene.

(4) Rubber Vibration Insulators

By using the above-mentioned crosslinked fluororubber article as a single layer or multilayer rubber layer in a rubber vibration insulator, it is possible to provide an automotive rubber vibration insulator which can easily satisfy the properties required of a rubber vibration insulator and which exhibits excellent properties.

In multilayer rubber vibration insulators other than automotive rubber vibration insulators, examples of layers comprising other materials include layers comprising other types of rubber, layers comprising thermoplastic resins, fiber reinforcing layers and metal foil layers.

In cases where chemical resistance and softness are particularly required, the other type of rubber is preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers, EPDM and acrylic rubbers, and more preferably at least one type of rubber selected from among the group comprising acrylonitrile-butadiene rubbers or hydrogenated products thereof, blended rubbers obtained by blending acrylonitrile-butadiene rubbers and poly(vinyl chloride), fluororubbers, epichlorohydrin rubbers.

In addition, the thermoplastic resin is preferably at least one type of thermoplastic resin selected from among the group comprising fluororesins, polyamide-based resins, polyolefin-based resins, polyester-based resins, poly(vinyl alcohol)-based resins, poly(vinyl chloride)-based resins and poly(phenylene sulfide)-based resins, and more preferably at least one type of thermoplastic resin selected from among the group comprising fluororesins, polyamide-based resins, poly(vinyl alcohol)-based resins and poly(phenylene sulfide)-based resins.

In addition, when producing a rubber vibration insulator having a multilayer structure, surface treatment may be carried out if necessary. This surface treatment is not particularly limited as long as the surface treatment enables adhesion, and can be, for example, discharge treatment such as plasma discharge treatment or corona discharge treatment or wet type metallic sodium/naphthalene treatment. In addition, primer treatment is also preferred as a surface treatment. Primer treatment can be carried out using a conventional method. When carrying out primer treatment, it is possible to treat the surface of a fluororubber that has not been subjected to a surface treatment, but it is more effective to carry out primer treatment after carrying out plasma discharge treatment, corona discharge treatment or treatment using metallic sodium/naphthalene.

(5) Diaphragms

The above-mentioned crosslinked fluororubber article can be advantageously used in diaphragms such as those mentioned below.

In automotive engine applications, for example, the above-mentioned crosslinked fluororubber article can be used as a diaphragm for a fuel system, exhaust system, braking system, drive system or ignition system, where heat resistance, oxidation resistance, fuel resistance, low gas permeability and the like are required.

Examples of diaphragms used in automotive engine fuel systems include diaphragms for fuel pumps, diaphragms for carburetors, diaphragms for pressure regulators, diaphragms for pulsation dampers, ORVR diaphragms, diaphragms for canisters and diaphragms for automatic fuel cocks.

Examples of diaphragms used in automotive engine exhaust systems include diaphragms for waste gates, diaphragms for actuators and EGR diaphragms.

Examples of diaphragms used in automotive engine braking systems include diaphragms for air brakes.

Examples of diaphragms used in automotive engine drive systems include oil pressure diaphragms.

Examples of diaphragms used in automotive engine ignition systems include diaphragms for distributors.

Examples of applications other than in automotive engines include diaphragms for ordinary pumps, diaphragms for valves, diaphragms for filter presses, diaphragms for blowers, diaphragms for air conditioning equipment, diaphragms for control equipment, diaphragms for water feed systems, diaphragms used in pumps used to supply hot water, diaphragms for high temperature steam, diaphragms for semiconductor manufacturing (for example, diaphragms for transporting chemicals used in manufacturing processes), diaphragms for food processing equipment, diaphragms for liquid storage tanks, diaphragms for pressure switches, diaphragms used in oil exploration/oil well drilling (for example, diaphragms used to supply lubricating oils for oil well drilling bits and the like), diaphragms for gas appliances such as gas-fired instantaneous water heater and gas meters, diaphragms for accumulators, diaphragms for suspension air springs and the like, diaphragms for naval screw feeders and diaphragms for artificial hearts, for which heat resistance, oil resistance, chemical resistance, steam resistance and low gas permeability are required.

(6) Hollow Rubber Molded Articles

The above-mentioned crosslinked fluororubber article can also be advantageously used in hollow rubber molded articles.

Examples of the above-mentioned hollow rubber molded articles include bladders, molded articles having bellows-like structures and primer pumps.

(6-1) Bladders

The above-mentioned crosslinked fluororubber article can be advantageously used in a bladder used in a tire vulcanizing process or molding process (a bladder for tire manufacturing).

In tire manufacturing processes, the types of bladder used are generally divided into two types, namely tire molding bladders, which are used when molding a green tire (unvulcanised tire) after assembling the various constituent components of the tire, and tire vulcanization bladders, which are used in order to impart the shape of the finished tire product during vulcanization.

The above-mentioned crosslinked fluororubber article can be used in both tire molding bladders and tire vulcanization bladders, but is preferably used in tire vulcanization bladders, which are repeatedly used under hot conditions and which require excellent heat resistance and durability at high temperatures.

(6-2) Molded Articles Having Bellows-Like Structures

A bellows-like structure is, for example, a structure having protrusions and/or recesses in the circumferential direction of a cylinder, and the shape of the protrusions and recesses may be a curved wave-like shape or a triangular wave shape.

Specific examples of molded articles having bellows-like structures include joints such as flexible joints and expansion joints, boots and grommets.

Joint members are joints used in pipes and piping equipment, and are used in applications such as preventing vibration and noise emanating from piping systems, absorbing expansion/contraction or displacement caused by fluctuations in temperature or pressure, absorbing dimensional fluctuations and ameliorating and preventing the effects of earthquakes and ground subsidence.

Flexible joints and expansion joints can be advantageously used for, for example, piping for shipbuilding, piping for pumps, compressors and the like, piping for chemical plants, electric piping, piping for civil engineering/water and automotive piping.

Boots are preferably used in a variety of industries, for example automotive boots such as constant velocity joint boots, dust covers, rack and pinion steering boots, pin boots and piston boots, boots for agricultural equipment, boots for industrial vehicles, boots for construction equipment, boots for hydraulic equipment, boots for pneumatic equipment, boots for centralized lubrication equipment, boots for transporting liquids, boots for firefighting equipment and boots for transporting a variety of liquefied gases.

(6-3) Primer Bulbs

Figure 2:
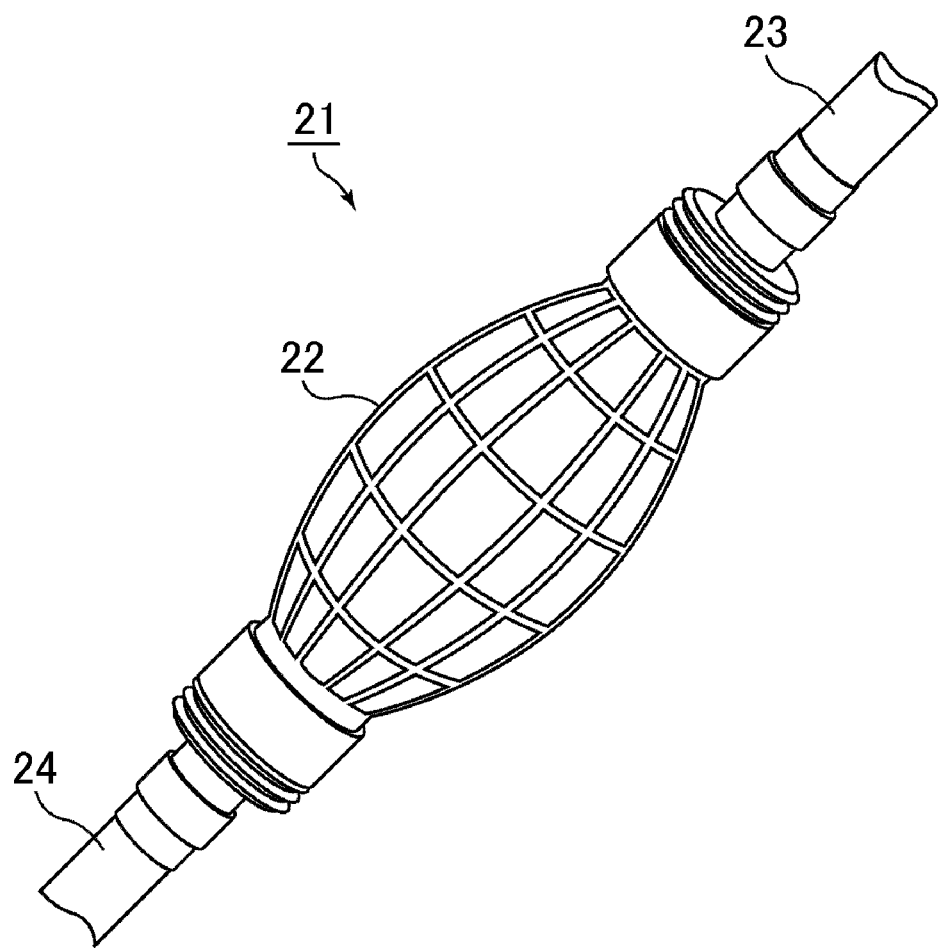
FIG. 2 is a schematic view showing one example of the shape of a primer bulb.

A primer bulb is a pump for supplying fuel to a carburetor (a float chamber in a carburetor) so that an engine can be easily started. A primer bulb has a single protrusion in the circumferential direction of a cylinder, and the shape of the protrusion is a curved wave-like shape. The shape of the primer bulb is, for example, the shape shown in FIG. 2, and the primer bulb 21 is generally disposed between a hose 23 on the discharge side (engine side) and a hose 24 on the intake side (fuel tank side).

Examples of the above-mentioned primer bulb include primer bulbs used in vehicles, ships, aircraft, construction equipment, agricultural equipment and mining equipment. For example, the above-mentioned primer bulb is particularly useful as a naval primer bulb.

(7) Fluororubber Coating Material Compositions

The fluororubber composition of the present invention can also be used as a fluororubber coating material composition. A coating film obtained from the above-mentioned fluororubber coating material composition exhibits excellent tensile properties at high temperatures, and therefore does not break under high-temperature conditions.

The above-mentioned fluororubber coating material composition is preferably one in which the fluororubber composition of the present invention is dissolved or dispersed in a liquid medium. In cases where the fluororubber composition of the present invention is used in a fluororubber coating material composition, the fluororubber composition preferably further contain at least a polyol crosslinking agent or polyamine crosslinking agent in addition to the above-mentioned fluororubber (A) and a carbon black (B). Particularly, the composition preferably contain a polyamine crosslinking agent.

The above-mentioned fluororubber coating material composition can be prepared by dissolving or dispersing the fluororubber composition, which is obtained by mixing the components that constitute the fluororubber composition by means of, for example, the above-mentioned method, in a liquid medium such as a ketone, ester or ether.

The above-mentioned fluororubber coating material composition may be coated directly on a substrate comprising a metal, glass, resin, rubber and the like, or coated on a substrate after a primer layer is formed on the substrate from an epoxy coating material and the like. Furthermore, another coating film (atop coat layer) may be formed on the coating film obtained from the above-mentioned fluororubber coating material composition.

A coating film obtained from the above-mentioned fluororubber coating material composition can be used in, for example, a sheet or belt; a sealant for a cylindrical member; a pre-coated metal; a packing rubber, O-ring, diaphragm, chemical-resistant tube, chemical stopper, fuel hose, valve seal, chemical plant gasket or engine gasket; a roll (for example, a fixing roll or contact bonding roll) for office automation equipment such as a copier, printer or fax machine, a conveyor belt and the like. The above-mentioned engine gasket can be, for example, a head gasket for an automotive engine and the like.

(8) Wire Coating Materials

The fluororubber composition can also be advantageously used in an insulating coating material for wires or a sheet material that forms a sheath layer on the outer periphery of an insulating layer of a wire, for which heat resistance and softness (flexibility) are required, and can give a coating film having excellent flexibility at high temperatures.

The above-mentioned insulating coating material or sheath material can be an insulating coating material or sheath material used for heat-resistant wires in automobiles, aircraft, military vehicles and the like, for which heat resistance is particularly required. Of these, the above-mentioned insulating coating material or sheath material is suitable as an insulating coating material or sheet material used in coated wires that are used in environments where the wires come into contact with transmission oil or engine oil of an internal combustion engine or inside automatic transmission systems or engine oil pans of vehicles.

(9) Biodiesel Fuel-Resistant Members (BDF-Resistant Members)

The above-mentioned crosslinked fluororubber article can also be advantageously used in members that come into contact with diesel fuel from biological sources, that is, biodiesel fuels (BDF). Biodiesel fuel includes fuel for diesel engines that is obtained by processing and/or refining a biomass raw material.

In cases where the above-mentioned crosslinked fluororubber article is used in a BDF-resistant member, if the above-mentioned crosslinked fluororubber article contains an acid acceptor, the acid acceptor reacts with the BDF, thereby swelling the crosslinked fluororubber article and raising concerns regarding deterioration, and it is therefore preferable for the above-mentioned crosslinked fluororubber article not to contain an acid acceptor in such cases. In other words, in cases where a crosslinked article obtained from the fluororubber composition of the present invention is used in a BDF-resistant member, it is preferable not to blend an acid acceptor in the fluororubber composition.

The above-mentioned biodiesel fuel-resistant member can be used in a variety of applications where contact with BDF occurs, for example, films, sheets, hoses such as vehicle fuel hoses and oil filler hoses, underground tubes for gasoline stations, bottles such as tanks for vehicle fuel, containers, tanks, automotive seals such as diaphragms, packing, flange gaskets for carburetors and O-rings for fuel pumps, and a variety of mechanical seals such as seals for hydraulic equipment.

Of these, the above-mentioned biodiesel fuel-resistant member is preferably a hose or sealing material, and more preferably a hose.

Among the above articles, the crosslinked fluororubber article obtained from the fluororubber composition of the present invention is excellent in durability at high temperatures, and is therefore particularly preferably used for a bladder for tire manufacturing. That is, the crosslinked fluororubber article obtained from the fluororubber composition of the present invention is preferably used for a bladder for tire manufacturing.

EXAMPLES

The present invention will now be explained through the use of examples, but the present invention is not limited only to these examples.

The methods for measuring the various physical properties used in the present invention are as follows.

(1) Shear Modulus (G')

Method for measuring the difference δG' (G' (1%)–G' (100%) between the shear modulus at a dynamic strain of 1% (G' (1%)) and the shear modulus at a dynamic strain of 100% (G' (100%)) The dynamic viscoelasticity is measured using a rubber process analyzer (RPA 2000, manufactured by Alpha Technologies) under conditions of 100° C. and 1 Hz.

(2) Mooney Viscosity ($ML_{1+10}$) (100° C.))

The Mooney viscosity is measured in accordance with JIS K6300. The measurement temperature is 100° C.

(3) Tensile Fatigue Test

In accordance with JIS-K 6270 and using a No. 6 dumbbell, a repeated tensile strain is applied at a distortion of 60 mm, a frequency of 2 Hz, a temperature of 150° C. and a chuck interval of 50 mm, and the number of cycles until the dumbbell breaks is counted. The measurement is carried out a maximum of 10,000 times.

(4) Tensile Strength at Break and Tensile Elongation at Break

The test equipment used is a "Tensilon" RTG-1310 manufactured by A & D and a "Strograph" TH-200D manufactured by Toyo Seiki Seisaku-sho. The tensile strength at break and tensile elongation at break are measured in accordance with JIS-K 6251, using a No. 6 dumbbell, a chuck gap of 50 mm and a stress rate of 500 mm/min. The measurement temperatures are 25° C. and 160° C.

(5) Hardness

The Hardness is measured by type A Durometer (manufactured by Excel Inc.) in accordance with JIS K6253. The measurement temperature is 25° C.

(6) Adhesion Test

A fluororubber composition having a thickness of about 1.2 mm (unvulcanised fluororubber sheet) and an acrylic rubber composition having a thickness of about 1.2 mm (unvulcanised acrylic rubber sheet) were stacked, and a resin film having a width of about 10 to 15 mm (a 10-μm-thick release film) was interposed therebetween on one end portion. The stack was inserted into a metal mold so as to be formed into a laminate having a thickness of 2 mm, and was pressed at 160° C. for 30 minutes to give a sheet-shaped laminate. The testing machine used was "Strograph" TH-200D (product of Toyo Seiki Seisakusho). A T-peel test was performed at a tensile speed of 50 mm/min at 25° C. and 200° C. in accordance with the method disclosed in JIS K6256-1993. Adhesive property was evaluated by adhesive strength and the following Detachment.

(Detachment)

Good: Material corruption of the vulcanized fluororubber sheet or acrylic rubber sheet occurred on the interface of the laminate to allow no detachment.

Poor: Detachment comparatively easily occurred on the interface of the laminate.

The following fluororubber, carbon black, crosslinking agent, crosslinking accelerator, processing aid, acid acceptor, acrylic rubber and additives were used in the examples.

(Carbon Black)

ISAF ($N_2SA$=119 $m^2$/g, DBP absorption number=114 ml/100 g). "Seast 6" (trade name), manufactured by Tokai Carbon.

HAF ($N_2SA$=79 $m^2$/g, DBP absorption number=101 ml/100 g). "Seast 3" (trade name), manufactured by TOKAI CARBON CO., LTD.

FEF ($N_2SA$=42 $m^2$/g, DBP absorption number=115 ml/100 g). "Seast SO" (trade name), manufactured by TOKAI CARBON CO., LTD.

(Crosslinking Agent)

2,5-dimethyl-2,5-di(t-butylperoxy) hexane. "Perhexa 25B" (trade name), manufactured by NOF Corporation 2,5-dimethyl-2,5-di(t-butylperoxy) hexine. "Perhexine 25B" (trade name), manufactured by NOF Corporation (Crosslinking accelerator)

Triallyl isocyanurate (TRIC). "TRIC" (trade name), manufactured by Nippon Kasei Chemical Co., Ltd.

(Processing Aids)

Stearyl amine (Farmin 86T) (manufactured by Kao Corporation)

Stearic acid (manufactured by Kanto Chemical Co., Ltd.)

(Acid acceptor)

Zinc oxide (class A) (manufactured by Sakai Chemical Industry Co., Ltd.)

(Cumarone Resin)

Nitto resin coumarone G-90 (coumarone-indene resin, manufactured by NITTO CHEMICAL CO., LTD.)

(Acrylic Rubber)

"XF-5140" (trade name, manufactured by Tohpe CO., LTD.)

(Additives)

Hexamethylenediamine carbamate, "V-1" (trade name, Daikin Industry CO., LTD)

1,3-di-o-tlylguanidine, "Nocceler DT" (trade name, Ouchi Shinko Chemical Industry CO., LTD)

(Fluororubber A1)

1.7 L of pure water, 0.17 g of a 50% aqueous solution of $CH_2$=$CFCF_2OCF(CF_3)CF_2OCF(CF_3)COONH_4$ and 6.8 g of a 50% aqueous solution of $F(CF_2)_5COONH_4$ were placed in an 3 L stainless steel autoclave, which was then thoroughly purged with nitrogen gas. After increasing the temperature to 80° C. while stirring at 600 rpm, monomers were fed so that the initial monomer composition in the tank was VdF/HFP=45/55 (molar ratio) and the pressure was 1.52 MPa. Next, a polymerization initiator solution obtained by dissolving 60 mg of ammonium persulfate (APS) in 5 mL of pure water was fed using nitrogen gas, thereby starting a reaction. At the point where the internal pressure dropped to 1.42 MPa due to the polymerization progressing, a monomer mixture comprising VdF/HFP (78/22 molar ratio) was fed as additional monomer until the internal pressure reached 1.52 MPa. At this point, 2.15 g of the diiodine compound $I(CF_2)_4I$ was fed. While repeatedly increasing and decreasing the pressure, a solution of a polymerization initiator prepared by dissolving 60 g of APS in 5 ml of pure water was fed every 3 hours using nitrogen gas, thereby allowing the polymerization reaction to continue. At the point where 600 g of the monomer mixture had been added, unreacted monomer was discharged, the autoclave was cooled, and 2364 g of a fluororubber dispersion having a solid content concentration of 25.8 mass % was obtained. The polymerization time was 7.1 hours. The copolymer composition of this fluororubber was investigated by means of NMR analysis, and found to have a VdF/HFP ratio of 78/22 (molar ratio) and a Mooney viscosity ($ML_{1+10}$ (100° C.)) of 77. This fluororubber was used as fluororubber A1.

Example 1

Using a kneader (Mix Labo 0.5 L (manufactured by Moriyama), rotor diameter: 6.6 cm, chip clearance: 0.05 cm), 20 parts by mass of a carbon black, 1.0 part by mass of zinc oxide, and 2 parts by mass of a coumarone resin were mixed with 100 parts by mass of fluororubber (A1) at a front rotor speed of 60 rpm and a back rotor speed of 50 rpm. The temperature of the mixed product discharged from the kneader was 158° C. This mixed product was cooled to a temperature of 100° C. or lower using an 8 inch open roll mixer adjusted to 25° C., mixed and then discharged. A fluororubber precompound B1 was obtained by ageing the resulting cooled and mixed product at 25° C. for 24 hours. The fluororubber precompound B1 had a shear modulus (G' (1%)) of 1027 kPa and a difference δG' between the shear modulus (G' (1%)) and the shear modulus (G' (100%)) of 863 kPa.

Using an 8 inch open roll mixer (manufactured by Kansai Roll Co., Ltd.), 1.0 part by mass of a crosslinking agent (perhexa 25B), 0.5 parts by mass of a crosslinking accelerator and 0.5 part by mass of stearylamine were mixed for 15 minutes with 123 parts by mass of a fluororubber precompound (B1) at a roll temperature of 25° C., a front roll rotation speed of 21 rpm, a back roll rotation frequency of 19 rpm and an inter-roll gap of 0.1 cm, thereby obtaining fluororubber full compounds (C1). The temperature of the mixed products discharged from the open roll mixer was 70 to 73° C.

The fluororubber precompounds (C1) were crosslinked by being pressed at 160° C. for 30 minutes, thereby obtaining sheet-like test pieces having thicknesses of 2 mm. Test pieces (JIS No. 6 dumbbells) were prepared from these sheets, and this test piece was measured for tensile strength at break and tensile elongation at break at 25° C. and 160° C. and also subjected to a tensile fatigue test at 150° C. The results are shown in Table 1.

Example 2

A fluororubber full compound was prepared by the same method as in Example 1, except that the quantity of a carbon black is changed as shown in Table 1.
Then, a test piece was prepared as in Example 1, and measured for tensile strength at break and tensile elongation at break and also subjected to a tensile fatigue test at 150° C.

Examples 3 and 4

A fluororubber full compound was prepared by the same method as in Example 1, except that the type of a carbon black is changed as shown in Table 1.
Then, a test piece was prepared as in Example 1, and measured for tensile strength at break and tensile elongation at break and also subjected to a tensile fatigue test at 150° C.

Example 5

Using a kneader (Mix Labo 0.5 L (manufactured by Moriyama), rotor diameter: 6.6 cm, chip clearance: 0.05 cm), 10 parts by mass of a carbon black and 2 parts by mass of a coumarone resin were mixed with 100 parts by mass of fluororubber (A1) at a front rotor speed of 60 rpm and a back rotor speed of 50 rpm. The temperature of the mixed product discharged from the kneader was 162° C. This mixed product was cooled to a temperature of 100° C. or lower using an 8 inch open roll mixer adjusted to 25° C., mixed and then discharged. A fluororubber precompound B4 was obtained by ageing the resulting cooled and mixed product at 25° C. for 24 hours. The fluororubber precompound B4 had a shear modulus (G' (1%)) of 316 kPa and a difference δG' between the shear modulus (G' (1%)) and the shear modulus (G' (100%)) of 171 kPa.

Using an 8 inch open roll mixer (manufactured by Kansai Roll Co., Ltd.), 2.0 part by mass of a crosslinking agent (perhexine 25B) and 3.0 parts by mass of a crosslinking accelerator were mixed for 15 minutes with 112.5 parts by mass of a fluororubber precompound (B4) at a roll temperature of 25° C., a front roll rotation speed of 21 rpm, a back roll rotation frequency of 19 rpm and an inter-roll gap of 0.1 cm, thereby obtaining fluororubber full compounds (C4). The temperature of the mixed products discharged from the open roll mixer was 68° C.

The fluororubber precompounds (C4) were crosslinked by being pressed at 160° C. for 30 minutes, thereby obtaining sheet-like test pieces having thicknesses of 2 mm. Test pieces (JIS No. 6 dumbbells) were prepared from these sheets, and this test piece was measured for tensile strength at break and tensile elongation at break at 25° C. and 200° C. and also subjected to a Hardness measurement at 25° C. The results are shown in Table 2.

The adhesion between the fluororubber full compound (C4) and the acrylic rubber composition shown in Table 3 was tested. Table 2 shows the results. The acrylic rubber composition was mixed using an 8-inch open roll mixer (product of KANSAI ROLL Co., Ltd.) under the mixing conditions of roll temperature: 25° C., front roll speed: 21 rpm, back roll speed: 19 rpm, and gap distance between rolls: 0.1 cm. The temperature of the product discharged was 68° C.

TABLE 1

|  | Example 1 | Example 2 | Example 3 | Example 4 |
|---|---|---|---|---|
| Composition of fluororubber precompound (part by mass) | | | | |
| Fluororubber (A1) | 100 | 100 | 100 | 100 |
| ISAF carbon | 20 | 10 | | |
| HAF carbon | | | 20 | |
| FEF carbon | | | | 20 |
| Cumarone resin | 2 | 2 | 2 | 2 |
| ZnO | 1 | 1 | 1 | 1 |
| δ G' (kPa) of fluororubber precompound | 863 | 205 | 797 | 663 |

TABLE 1-continued

| | Example 1 | Example 2 | Example 3 | Example 4 |
|---|---|---|---|---|
| Composition of fluororubber full compound (part by mass) | | | | |
| Fluororubber precompound | 123 | 113 | 123 | 123 |
| TAIC | 0.5 | 0.5 | 0.5 | 0.5 |
| Perhexa 25B | 1 | 1 | 1 | 1 |
| Stearylamine | 0.5 | 0.5 | 0.5 | 0.5 |
| Conditions of cross-linking by pressing | 160° C., 30 min | 160° C., 30 min | 160° C., 30 min | 160° C., 30 min |
| Mechanical properties of crosslinked article | | | | |
| Measurement temperature 25° C. | | | | |
| Tensile strength at break (MPa) | 13.7 | 8.8 | 12.8 | 11.4 |
| Tensile elongation at break (%) | 850 | 750 | 820 | 820 |
| Hardness | 81 | 67 | 79 | 77 |
| Measurement temperature 160° C. | | | | |
| Tensile strength at break (MPa) | 3.5 | 2.2 | 3.2 | 2.9 |
| Tensile elongation at break (%) | 631 | 460 | 600 | 580 |
| Tensile fatigue test (150° C.) | | | | |
| The number of cycles until breaking | No breaking even at 10000 times | No breaking even at 10000 times | No breaking even at 10000 times | No breaking even at 10000 times |

The results in Table 1 show that the crosslinked article obtained in Examples 1 to 4 subjected to a tensile fatigue test at 150° C. does not break even when a repeated tensile strain is applied at 10,000 times, and has excellent durability at extremely high temperatures.

TABLE 2

| | Example 5 |
|---|---|
| Composition of fluororubber precompound (part by mass) | |
| Fluororubber (A1) | 100 |
| ISAF carbon | 10 |
| Cumarone resin | 2 |
| Stearylamine | 0.5 |
| δ G' (kPa) of fluororubber precompound | 171 |
| Composition of fluororubber full compound (part by mass) | |
| Fluororubber precompound | 112.5 |
| TAIC | 3 |
| Perhexine 25B | 2 |
| Conditions of cross-linking by pressing | 160° C., 30 min |
| Mechanical properties of crosslinked article | |
| Measurement temperature 25° C. | |
| Tensile strength at break (MPa) | 28.2 |
| Tensile elongation at break (%) | 530 |
| Hardness | 70 |
| Measurement temperature 160° C. | |
| Tensile strength at break (MPa) | 4.2 |
| Tensile elongation at break (%) | 250 |
| Adhesion test to acrylic rubber | |
| Measurement temperature 25° C. | |
| Adhesion strength (N/mm) | 2.5 |
| Detachment | good |
| Measurement temperature 200° C. | |
| Adhesion strength (N/mm) | 0.65 |
| Detachment | good |

TABLE 3

| Composition of acrylic rubber fullcompound (part by mass) | |
|---|---|
| Acrylic rubber | 100 |
| FEF carbon | 50 |
| Stearic acid | 2.5 |
| Hexamethylenediamine carbamate | 1 |
| 1,3-di-o-tolylguanidine | 1 |
| TAIC | 2 |

EXPLANATION OF SYMBOLS

10: Open roll
11: First roll
12: Second roll
13: Intermediate composition
14: Composition rolled into sheet
21: Primer valve
22: Projecting part
23: Hose 22 on discharge side (engine side)
24: Hose 23 on intake side (fuel tank side)

The invention claimed is:

1. A fluororubber composition comprising:
a fluororubber (A);
a carbon black (B);
an aromatic petroleum resin (E); and
a crosslinking agent (C),
the fluororubber composition has a difference δG' (G'(1%)-G'(100%)) of not lower than 150 kPa and not higher than 863 kPa, where G'(1%) denotes a shear modulus at a dynamic strain of 1%, G'(100%) denotes a shear modulus at a dynamic strain of 100%, and G'(1%) and G'(100%) are determined by a dynamic viscoelasticity test carried out on an unvulcanised rubber with a rubber process analyzer (RPA) in a condition that the measurement frequency is 1 Hz and the measurement temperature is 100° C.,
wherein the aromatic petroleum resin (E) is a coumarone-indene-styrene resin,
wherein the carbon black (B) has a nitrogen adsorption specific surface area (N$_2$SA) of 25 to 180 m$^2$/g and a dibutyl phthalate (DBP) absorption number of 40 to 175 ml/100 g, wherein the carbon black (B) is at least one selected from the group consisting of ISAF and HAF, wherein the fluororubber composition contains 8 to 20 parts by mass of the carbon black (B) relative to 100 parts by mass of the fluororubber (A), wherein the amount of the aromatic petroleum resin (E) is 0.01 to 2 parts by mass relative to 100 parts by mass of the fluororubber (A), wherein the fluororubber (A) consists of a vinylidene fluoride/hexafluoropropylene binary copolymer in which the vinylidene fluoride unit/the hexafluoropropylene unit (molar ratio) is 78/22, wherein the crosslinking agent (C) is an organic peroxide, and wherein the blending quantity of the crosslinking agent (C) is 0.1 to 8 parts by mass relative to 100 parts by mass of the fluororubber (A).

2. A crosslinked fluororubber article obtainable obtained by crosslinking of the fluororubber composition according to claim 1.

3. A hose including a crosslinked fluororubber layer obtained by crosslinking of the fluororubber composition according to claim 1.

\* \* \* \* \*